US010387808B1

United States Patent
Scott

(10) Patent No.: US 10,387,808 B1
(45) Date of Patent: Aug. 20, 2019

(54) SYSTEM AND METHOD FOR THE COLLECTION, DISPLAY, AND REPORTING OF UPLIFT DATA

(71) Applicant: AVIATION AERO TIX, LLC, College Station, TX (US)

(72) Inventor: Jerry Edward Scott, Houston, TX (US)

(73) Assignee: AVIATION AERO TIX, LLC, College Station, TX (US)

( * ) Notice: Subject to any disclaimer, the term of this patent is extended or adjusted under 35 U.S.C. 154(b) by 0 days.

(21) Appl. No.: 16/124,964

(22) Filed: Sep. 7, 2018

Related U.S. Application Data

(60) Provisional application No. 62/555,933, filed on Sep. 8, 2017, provisional application No. 62/568,641, filed on Oct. 5, 2017.

(51) Int. Cl.
*G06Q 10/06* (2012.01)
*B67D 7/08* (2010.01)
*G06Q 50/06* (2012.01)

(52) U.S. Cl.
CPC .............. *G06Q 10/06* (2013.01); *B67D 7/08* (2013.01); *G06Q 50/06* (2013.01)

(58) Field of Classification Search
None
See application file for complete search history.

(56) References Cited

U.S. PATENT DOCUMENTS

| 4,337,512 | A | * | 6/1982 | Furuhashi | F02P 5/1504 123/406.46 |
| 4,695,941 | A | * | 9/1987 | Kumar | B60L 3/12 318/565 |
| 4,819,183 | A | * | 4/1989 | O'Brien | B67D 7/08 700/282 |
| 2005/0216139 | A1 | * | 9/2005 | Laughlin | G06Q 30/00 701/3 |
| 2008/0065449 | A1 | * | 3/2008 | Blagg | G06Q 10/06 705/7.13 |
| 2011/0099022 | A1 | * | 4/2011 | Stochniol | G06Q 30/02 705/1.1 |
| 2012/0173072 | A1 | * | 7/2012 | Portocalis | G06Q 10/06 701/29.3 |

(Continued)

*Primary Examiner* — Fateh M Obaid
(74) *Attorney, Agent, or Firm* — Greenberg Traurig, LLP; Mark G. Chretien; Ira R. Hatton

(57) ABSTRACT

The fuel uplift service, system and software application is based on data entry via a computer or hand-held device (e.g., smartphone, tablet, or similar device) that concerns the uplift of fuel, data, services and systems concerning fuel uplift operations. Fuel uplift personnel enter data and information concerning fuel uplift operations on a handheld device or other computer device and data, information, and other information generated by the fuel uplift service, system and application is transmitted to servers which store, process and generate information and documents based at least in part on the transmitted information. The servers allow authorized and authenticated users to store, access and/or retrieve data and information from one or more databases, information including, for example, information concerning stakeholders/clients, volume data, sales invoice data, inventory level data, purchase record data and information, and service record data and information.

18 Claims, 11 Drawing Sheets

(56) References Cited

U.S. PATENT DOCUMENTS

| | | | | |
|---|---|---|---|---|
| 2013/0046422 A1* | 2/2013 | Cabos | .................. | G08G 5/0034 |
| | | | | 701/3 |
| 2013/0075532 A1* | 3/2013 | Fuscone | ................ | B64D 37/00 |
| | | | | 244/135 A |
| 2014/0229055 A1* | 8/2014 | Itoi | ......................... | H04Q 9/00 |
| | | | | 701/31.5 |
| 2014/0244098 A1* | 8/2014 | Ueda | ...................... | G06Q 50/02 |
| | | | | 701/29.3 |
| 2015/0241295 A1* | 8/2015 | Fuscone | ................ | G01M 1/125 |
| | | | | 701/124 |
| 2018/0189704 A1* | 7/2018 | Kumar | ............. | G06Q 10/06315 |
| 2018/0336743 A1* | 11/2018 | Lonski | .................. | G01S 5/0018 |

\* cited by examiner

| FUEL UPLIFT SERVICE AND SYSTEM COMMERCIAL SCREEN SHOTS |
|---|

602  606

(a) Crew Member *  [EDIT] (a)
(b) Supplier *  [EDIT] (b)
(c) Airport *  [EDIT] (c)
(d) Airline *  [EDIT] (d)
(e) Registration # *  [EDIT] (e)

*FIG. 6A*

| FUEL UPLIFT SERVICE AND SYSTEM COMMERCIAL SCREEN SHOTS |
|---|

(f) Reseller *  [EDIT] (f)
(g) Fuel Type *  [EDIT] (g)
(h) Meter Reading Start *  [EDIT] (h)
(i) Meter Reading Stop *  [EDIT] (i)
(j) Volume *  [EDIT] (j)

*FIG. 6B*

| FUEL UPLIFT SERVICE AND SYSTEM COMMERCIAL SCREEN SHOTS |
|---|

(k) Delivery Equipment * (only visible to admin)     [EDIT] (k)

(l) ☐ Water Check was performed * (only visible to admin)     [EDIT] (l)

(m) Crew Notes *     [EDIT] (m)

(n) ☐ I have reviewed and agree with the data entered *     [EDIT] (n)

FIG. 6C

| FUEL UPLIFT SERVICE AND SYSTEM BUSINESS AVIATION SCREEN SHOTS |
|---|

612        616

(a) Crew Member *     [EDIT] (a)

(b) Supplier *     [EDIT] (b)

(c) Airport *     [EDIT] (c)

(d) Aircraft Operator *     [EDIT] (d)

(e) Registration # *     [EDIT] (e)

(f) Flight Type *     [EDIT] (f)

(g) Reseller *     [EDIT] (g)

(h) Card Type *     [EDIT] (h)

(i) Card Number *     [EDIT] (i)

FIG. 6D

| FUEL UPLIFT SERVICE AND SYSTEM BUSINESS AVIATION SCREEN SHOTS |
|---|
| (j) Fuel Type *  [EDIT] (j) |
| (k) Meter Reading Start *  [EDIT] (k) |
| (l) Meter Reading Stop *  [EDIT] (l) |
| (m) Volume *  [EDIT] (m) |
| (n) Delivery Equipment * (only visible to admin)  [EDIT] (n) |
| (o) Next Destination *  [EDIT] (o) |
| (p) Client Email *  [EDIT] (p) |
| (q) ☐ Water Check was performed * (only visible to admin)  [EDIT] (q) |
| (r) Crew Notes *  [EDIT] (r) |

FIG. 6E

| FUEL UPLIFT SERVICE AND SYSTEM BUSINESS AVIATION SCREEN SHOTS |
|---|
| Crew Member Signature |
| Click Below to Enter Signature |
| (s) [signature box] |
| (t) ☐ I have reviewed and agree with the data entered *  [EDIT] (s) |

FIG. 6F

SUPPLIER DELIVERY TICKET

COMPANY LOGO

Delivery Ticket Number

Appropriate Tax Information

Supplier Name
Supplier Address
Contact Information

Airport ICAO / IATA: _____
UPLIFT DATE:
____ / ____ / ____
Month / Day / Year

Aircraft Operator Name

Aircraft Registration

Aircraft Type

Flight Number:

Coming From:

Next Destination:

Flight Type:

Product (Check One):
Jet A _____

Volume in U.S. Gallons:

Product:
Avgas _____

Meter Reading Start:

Fueling Start Time:

Equipment Number:

Meter Reading Stop:

Fueling Stop Time:

Reseller (if applicable):

Reference Number:

Card Number (if applicable):

Card Expiration Date:

Customer Signature

*FIG. 7*

Inventory / Client Management

| | Location Volume Calculator | EXAMPLE | NOTES |
|---|---|---|---|
| 1 | Location | LBG | ICAO / IATA |
| 2 | Start Date | XX-XXX-XX | Calendar Pick |
| 3 | Start Time | XX:XX | Similar to an alarm on your phone |
| 4 | End Date (or to current - now) | XX-XXX-XX | Calendar Pick |
| 5 | End Time (or to current - now) | XX:XX | Similar to an alarm on your phone |
| 6 | Beginning inventory amount | NUMBER | Input by client (unit of measure consistent with that location) |
| 7 | Inventory delivered during period | NUMBER | Input by client (unit of measure consistent with that location) |
| 8 | Sales during the start and ending date and time | NUMBER | Sales totaled during start and ending date and time |
| 9 | Estimated ending inventory amount | NUMBER | #6 + #7 - #8 = estimated ending inventory |

*FIG. 8A*

Inventory / Client Management

| | Location Volume Calculator | EXAMPLE | NOTES |
|---|---|---|---|
| 1 | Location | LBG | ICAO / IATA |
| 2 | Start Date | 20-Mar-17 | Calendar Pick |
| 3 | Start Time | 00:01 LCL | Similar to an alarm on your phone |
| 4 | End Date (or to current - now) | 27-Mar-17 | Calendar Pick |
| 5 | End Time (or to current - now) | 23:59 LCL | Similar to an alarm on your phone |
| 6 | Beginning inventory amount | 2,050,500 L | Input by client (unit of measure consistent with that location) |
| 7 | Inventory delivered during period | 317,974 L | Input by client (unit of measure consistent with that location) |
| 8 | Sales during the start and ending date and time | 1,575,050 L | Sales totaled during start and ending date and time |
| 9 | Estimated ending inventory amount | 793,424 L | #6 + #7 - #8 = estimated ending inventory |

*FIG. 8B*

SYSTEM AND METHOD FOR THE COLLECTION, DISPLAY, AND REPORTING OF UPLIFT DATA

CROSS-REFERENCE TO RELATED APPLICATIONS

This application claims the benefit, and priority benefit, of U.S. Provisional Patent Application Ser. No. 62/555,933, filed Sep. 8, 2017, and U.S. Provisional Patent Application Ser. No. 62/568,641, filed Oct. 5, 2017, each titled "SYSTEM AND METHOD FOR THE COLLECTION, DISPLAY, AND REPORTING OF UPLIFT DATA," the disclosures of which are incorporated by reference herein in their entirety.

STATEMENT REGARDING FEDERALLY SPONSORED RESEARCH OR DEVELOPMENT

None.

REFERENCE TO SEQUENCE LISTING, A TABLE, OR A COMPUTER PROGRAM LISTING COMPACT DISK APPENDIX

None.

BACKGROUND

Field of the Invention

The present invention is directed to a system, service and method for collecting and displaying data, or portions thereof, from and to input and display devices. Furthermore, the system and method of the present invention are partially directed to utilizing one or more of a website and an application to collect, disperse and/or display data over a network to authorized users.

Background

Implementations of the present disclosure are directed to transmitting and displaying fuel uplift and fuel transaction data and/or information on mobile devices and generating documents, reports and/or other relevant documents detailing data and information about the same. While fuel uplift personnel, fuel providers and sellers currently track fuel uplift operations to some degree or another, there are still significant limitations to the information that can be communicated in a practical and efficient manner. Because of the importance of relaying correct fuel uplift data and fuel transaction data and information in general, it is important that the technology provide certain capabilities and functionality over a computer network.

BRIEF SUMMARY

One or more embodiments of the fuel uplift service, system and method provide a fuel uplift service for authorized users with a graphical user interface and data management servers for real-time and on-demand storage, management and processing of fuel uplift data and other information transmitted over a network. An authorized user can utilize one or more of a software application, a direct network connection, a wireless connection and a website to access integrated data storage and management assets.

In one or more examples of one or more of the embodiments of the present invention, the systems and methods include processes that allow for the input and manipulation of fuel uplift data to generate one or more documents, reports, and graphical representations of the uplift data, sales information, inventory data and other related information. Other implementations of this aspect include corresponding systems, apparatuses, one or more graphical interfaces, and computer programs encoded on computer storage devices, configured to perform the functions of the systems, processes and methods described herein.

Examples of graphical user interfaces (GUIs) utilized in one or more embodiments allow for the input of fuel uplift data and the transmittal of the relevant data to data management servers to store, manage, manipulate and process the input fuel uplift data and other associated information. Once the fuel uplift data is received, the fuel uplift service can either automatically or upon requests, depending upon user or client preferences, generate fuel delivery tickets, invoices, inventory reports, sales reports, and other documents for delivery and/or retrieval by authorized users. One or more embodiments of the present invention utilize a software application in conjunction with one or more of a network and a fuel uplift service website.

One or more embodiments of the fuel uplift service allow for the notification to fueling personnel of upcoming fuel requirements and the collection of pertinent fuel transaction information to notify participating parties of the transaction details. In these instances, the fuel uplift service system stores, manages, manipulates and processes data and information relevant to one or more fuel transactions to generate and report summary data. A reporting manager module included within one or more of the data management servers processes the relevant fuel uplift data and generates, in an HTML format, CSV format or in an Excel spreadsheet for processing, requested documents and reports. These documents and reports include, for example, a fuel delivery ticket, an invoicing report, a sales report, and other requested relevant documents and reports. Both scheduled and non-scheduled fuel transactions can be processed by the fuel uplift service.

One or more embodiments of the fuel uplift service utilize a software application that is compatible for use with Apple computer devices and/or Android computer devices. The fuel uplift service and method allows for the input and transmittal of fuel uplift data, and the requests for fuel delivery tickets, invoicing and sales reports, and other relevant and associated documents and information. One or more embodiments of the fuel uplift service utilize a fuel uplift service website that displays a GUI on user devices to enable the same to input fuel uplift data, and request fuel delivery tickets, invoicing and sales reports, and other relevant and associated documents and information. The software application and fuel uplift website allow for the collection of relevant information on fuel uplifts and other fuel transactions and transmittal of the relevant information to the fuel uplift service data management server(s) for storage and distribution to participants in the fuel transaction and other authorized users.

One or more embodiments of the fuel uplift service include a graphical user interface that displays a series of data fields that allow for the input, selection, and/or generation of fuel transaction data and information. The data fields can take the form of fields, text fields, check-boxes, buttons, radio buttons, pull-down menus, drop-down menus, touch-screen display areas, barcode entry fields, list boxes, scroll bars, track bars and/or toolbars. One example of a GUI that can be utilized by authorized personnel to input and transmit fuel uplift data and information to the fuel uplift data management servers includes one or more of the following data fields and data field types: location, date of fueling, client name, aircraft registration, start and stop time of the fueling, airport identifier, location of the fueling (e.g., a particular area of the airport), fuel type, next or upcoming destination(s), volume of the uplift, signature of crew member, flight number, into-plane agent, supplier name, supplier address, contact information, tax information, airport ICAO/IATA, aircraft operator name, aircraft registration, aircraft type, coming from, flight type, fuel product fields (e.g., Jet A, Avgas), volume, meter reading start/stop, fueling stop time, delivery equipment, client email, reseller, reference number, barcode identification, credit card information (e.g., number, expiration date, CSV number, issuer, identity of authorized user, billing information) and non-bank fuel card type, and account number(s). One or more embodiments of the fuel uplift service system include a fuel uplift website that can display and allow authorized users to input and transmit fuel uplift data described herein or similar types of information to the fuel uplift data management server(s) after inputting the relevant fuel uplift data into one or more of the aforementioned data fields.

One or more embodiments of the present invention include a fuel uplift service system that further includes filters associated with certain of the data fields that can assist an authorized user to input correct data and information into the data fields. For example, a relevant filter associated with one or more data fields can limit input data that can be entered by a user into the one or more data fields by relying upon one or more of preferences, previously stored information, GPS information, current time and date information, limits, lists of user selectable authorized entries, volume and weight conversions (e.g., fuel, aircraft, cargo, etc.), currency exchange data and conversions, language selections, regional and geographical information and selections, and other relevant information associated with any one or more of the aforementioned categories and types of information. Once the required fuel uplift data and information is submitted to the fuel uplift data management server(s), an image of the delivery ticket containing relevant information, including a subset of the information or types of information provided herein, can be sent automatically or upon request to appropriate participants in the transaction or other authorized users.

The fuel uplift service can generate delivery tickets are available for review, printing and forwarding via the software application and/or the fuel uplift website by authorized users (e.g., users that have been assigned a username and password and/or have satisfied other authentication and verification procedures/requirements). For example, availability and access to delivery tickets and transaction details stored on the fuel uplift service data management server(s) can be limited to companies and participants relevant to that transaction. Delivery ticket information and images are stored by the fuel uplift service data management server(s) for future access by appropriate participants. Participants in the transaction can include, for example, one or more of an airline, reseller, customer, supplier and other fuel uplift personnel, all of which can be afforded the ability, once authorization has been granted through the fuel uplift service, to submit current and future uplift data and information for single or multiple uplift requirements. Notification of fuel uplift activities and associated reports and documents can be provided to authorized users of the fuel uplift service on their user devices at the airport specified or at another remote site over a network.

In one or more embodiments of the present invention, one or more of the fuel uplift service website and the fuel uplift service system software application affords authorized users the ability to access data and information and to improve inventory management as well as client usage management. For example, the fuel uplift service system includes an inventory monitoring module and a reporting manager module that gives an authorized entity, such as a fuel supplier, the ability to manage relevant inventories and client sales, and generate one or more sales and inventory reports. Embodiments of the fuel uplift service system have the capability to provide various levels of authorization to different users and classes of users of the fuel uplift service. For example, the relevant supplier(s) or other users can be provided access in such a manner that they are only able to see volume information specific to their company sales. In another example, an authorized supplier can be provided access such that they can request the fuel uplift service to provide an estimate of its fuel product inventory level as of that moment or at a point in time in the past, or provide a forecast of what its fuel product inventory will be at a time in the future. In this example, the supplier can select a start and stop date and time for the report. The fuel uplift service will utilize information including fuel uplift activities including any additional inventory that was/will be added during the specific time period selected. The GUI provided via the software application and/or the fuel uplift service website will provide an authorized user with the appropriate data fields to enter and submit the relevant information. Once submitted, the one or more of the fuel uplift database management servers will store and, where required, process the submitted information to generate sales, invoicing, or other requested information and provide access to and display the requested information to authorized users. For example, one or more embodiments of the fuel uplift service system includes an accounts invoicing module 186 and an accounts payable/receivable module 188 that can total the sales during a relevant time period, and an inventory monitoring module 190 that can provide the supplier with a current inventory estimate. In addition, the supplier can set an alert threshold that once reached will alert the supplier designee of the alert. This alert can be set at different levels of inventory and for different airports or other fueling depots or fueling facilities as needed.

A system, method and techniques of providing a fuel uplift service to an aircraft and providing fuel uplift operations, in one aspect, may comprise one or more secure databases that store fuel uplift information accessible via an authorized access request through a network. In some embodiments, one or more processors can interact with the one or more secure databases to manipulate the fuel uplift information in response to the authorized access. In some embodiments, a graphical user interface that includes a plurality of data fields is configured to enable a user to input fuel uplift information into the computer system using an input device. In some embodiments, an inventory monitoring module is executed by at least one of the one or more processors and configures the at least one processor to manage and track fuel inventory levels of a client and generate fuel management and tracking information to be accessibly stored on at least one of the one or more secured databases. In some embodiments, a reporting manager that, when executed by at least one of the one or more processors in response to the authorized access request, uses one or more document templates that includes a plurality of data fields. In some embodiments, a reporting manager identifies at least a portion of the fuel uplift information stored in one or more of the databases. In some embodiments, a reporting manager associates the identified fuel uplift information with the appropriate data fields included in at least one of the one or more document templates. In some embodiments, a reporting manager generates a fuel uplift document. In some embodiments, a reporting manager includes software instructions that, when executed by the at least one processor, further configures the at least one processor to utilize the at least one document template to generate a fuel delivery ticket in response to an authorized access request for facilitation of fuel uplift operations and fuel uplift management decisions.

In some embodiments, a reporting manager includes software instructions that, when executed by the at least one processor, further configures the at least one processor to utilize at least a portion of the fuel uplift information to generate graphic data that represents the portion of the fuel uplift information in a graphic format. In some embodiments, a reporting manager displays the graphic data in the generated fuel uplift document. In some embodiments, the one or more secure databases further comprise an accounting record database that stores fuel uplift account information. In some embodiments, an account invoice module that, when executed by at least one of the one or more processors, configures the at least one processor to manipulate at least a portion of the fuel uplift account information and generate accounting records associated with a supplier of aircraft fuel. In some embodiments, the one or more secure databases further comprise an inventory record database that stores fuel uplift inventory information. In some embodiments, the inventory information includes fuel product levels, sales information, and delivery information. In some embodiments, the inventory monitoring module includes software instructions that, when executed by the at least one processor in response to an authorized access request, further configures the at least one processor to manipulate at least a portion of the inventory information. In some embodiments, the inventory monitoring module generates information relating to the amount of fuel products in a fuel supplier's inventory.

In some embodiments, the inventory monitoring module utilizes fuel uplift inventory information to estimate an amount of fuel a fuel supplier will have on a predetermined date. In some embodiments, the inventory information includes one of a start date, a start time, an end date, an end time, an amount of fuel the fuel supplier has on the start date, an amount of fuel that has been delivered and an amount of fuel that will be delivered to the fuel supplier between the start and end dates, and the amount of fuel the fuel supplier has sold and a projected amount of fuel the fuel supplier will sale between the start and end dates. In some embodiments, the inventory monitoring module includes an electronic spreadsheet inventory module that includes software instructions that, when executed by the at least one processor, further configures the at least one processor to arrange the fuel uplift inventory information in a spreadsheet format. In some embodiments, the spreadsheet can be transmitted upon request in response to the authorized access.

In some embodiments, a transaction number and tracking module, when executed by at least one of the one or more processors, configures the at least one processor to assign a unique first transaction number to a fuel uplift customer order. In some embodiments, the transaction number and tracking module, when executed by at least one of the one or more processors, configures the at least one processor to assign a unique second transaction number to a fuel product. In some embodiments, the transaction number and tracking module, when executed by at least one of the one or more processors, configures the at least one processor to track the customer order and fuel product from respective first times the first and second transaction numbers are received into one or more of the secure databases to respective second times the first and second transaction numbers are tagged as obsolete. In some embodiments, the second time associated with the customer order represents a time that any obligations owed pursuant to the customer order have been satisfied. In some embodiments, the second time associated with the fuel product represents a time that the fuel product was uplifted to an aircraft or transferred to a customer.

In some embodiments, the tracking module includes software instructions that, when executed by the at least one processor, further configures the at least one processor to assign a unique tracking number to a fuel uplift device utilized by a fuel supplier to perform fuel uplift operations. In some embodiments, the transaction number is stored in at least one of the one or more secure databases in a manner such that the tracking module further configures the at least one processor to utilize the transaction number to track the fuel uplift device over a historical period beginning at or after a first time when the unique tracking number associated with the fuel uplift device was received into one or more of the secure databases and ending at or before a second time when the unique transaction number is tagged as obsolete. In some embodiments, the second time represents a time that the fuel uplift device is no longer in the fuel supplier's inventory.

In some embodiments, an imaging module that, when executed by at least one of the one or more processors, configures the at least one processor to convert images of fuel uplift information to machine-coded text that is associated with a fuel uplift operation. In some embodiments, a unit conversion module that, when executed by at least one of the one or more processors, configures the at least one processor to convert one standard unit of measurement associated with aircraft fuel to be uplifted to an aircraft to another standard unit of measurement. In some embodiments, a pricing and discount conversion module, when executed by at least one of the one or more processors, configures the at least one processor to allow a fuel supplier to assign pricing to quantities of aircraft fuel. In some embodiments, a pricing and discount conversion module, when executed by at least one of the one or more processors, configures the at least one processor to apply discounts based upon a quantity of aircraft purchased. In some embodiments, a pricing and discount conversion module, when executed by at least one of the one or more processors, configures the at least one processor to create customer pricing schedules.

In some embodiments, a location code module, when executed by at least one of the one or more processors, configures the at least one processor to utilize one of an airport location code, a warehouse code, an aircraft staging code and a fuel storage bin code to track one or more of a fuel product, an aircraft fuel uplift activity and a fuel uplift equipment from a first location to a second location. In some embodiments, the reporting manager includes software instructions that, when executed by the at least one processor, further configures the at least one processor to automatically generate a report. In some embodiments, the reporting manager includes software instructions that, when executed by the at least one processor, further configures the at least one processor to automatically generate a report that is customizable by an authorized user to include only the types of fuel uplift information selected by the user.

In some embodiments, the network utilized by the system, method and techniques of providing a fuel uplift service to an aircraft includes one or more of a public network, a public switched telephone network, the Internet, a wide area network, a local area network, a cellular network, and a proprietary network. In some embodiments, the graphical user interface is displayed on a user device. In some embodiments, the user device includes at least one of a portable computing device, a personal digital assistant, a wireless smartphone, a personal computer, and a game terminal. In some embodiments, at least a portion of the fuel uplift information stored by the one or more secure databases is received from the user device. In some embodiments, the graphical user interface is configured to assist in the prevention of transmitting incorrect fuel uplift information to the one or more secure databases. In some embodiments, the software application utilized by the one or more user devices generates an error message in response to an entry into at least one of the data fields by comparing at least one of: (i) global positioning data with an airport code entry, (ii) a type of aircraft entry with a fuel product entry, and (iii) a type of fuel delivery equipment with a type of fuel uplift service. In some embodiments, the graphical user interface displays an error message in response to an entry into at least one of the data fields by comparing at least one of: (i) global positioning data with an airport code entry, (ii) a type of aircraft entry with a fuel product entry, and (iii) a type of fuel delivery equipment with a type of fuel uplift service.

In some embodiments, the reporting manager includes software instructions that, when executed by the at least one processor, configures the at least one processor to generate graphical a summarization of at least a portion of the fuel uplift information. In some embodiments, the graphical summarization includes at least one of a chart, a graph and a table. In some embodiments, the inventory monitoring module includes software instructions that, when executed by the at least one processor in response to an authorized request, configures the at least one processor to provide a forecast of a fuel supplier's inventory levels of a fuel product for a predetermined specified time in the future based at least in part upon historical fuel uplift data and extrapolated fuel uplift data. In some embodiments, a verification module that, when executed by at least one of the one or more processors, configures the at least one processor to utilize one of a user assigned log-in, a user assigned password, and an access key to allow a user to interact with the fuel uplift service and input and/or receive fuel uplift information over the network.

As described herein, other embodiments of the present invention provide systems including one or more processors, and a computer-readable medium coupled to the one or more processors having instructions stored thereon which, when executed by the one or more processors, cause the one or more processors to perform one or more of the methods provided herein.

It is appreciated that systems and methods in accordance with the present disclosure can include any combination of the aspects and features described herein. That is to say that the systems and methods in accordance with the present disclosure are not limited to the combinations of aspects and features specifically described herein, but also include any combination of the aspects and features provided in any of the one or more embodiments and examples of those embodiments.

The details of one or more implementations are set forth in the accompanying drawings and the description below. Other features, objects, and advantages will be apparent from the description and drawings, and from the claims.

BRIEF DESCRIPTION OF THE DRAWINGS

FIGS. 6A through 6F provide examples of graphical user interfaces with which authorized and authenticated users can interact to input and transmit data to the fuel uplift data system using the fuel uplift data software application.

FIG. 7 illustrates an example of a fuel delivery ticket that can be generated by the fuel uplift service, system and software application of the present invention.

FIGS. 8A and 8B illustrate graphic user interfaces that describe information that is utilized by the fuel uplift service to perform inventory and client management functions, including the generation of an inventory report.

DETAILED DESCRIPTION OF EMBODIMENTS OF THE INVENTION

Figure 1A:
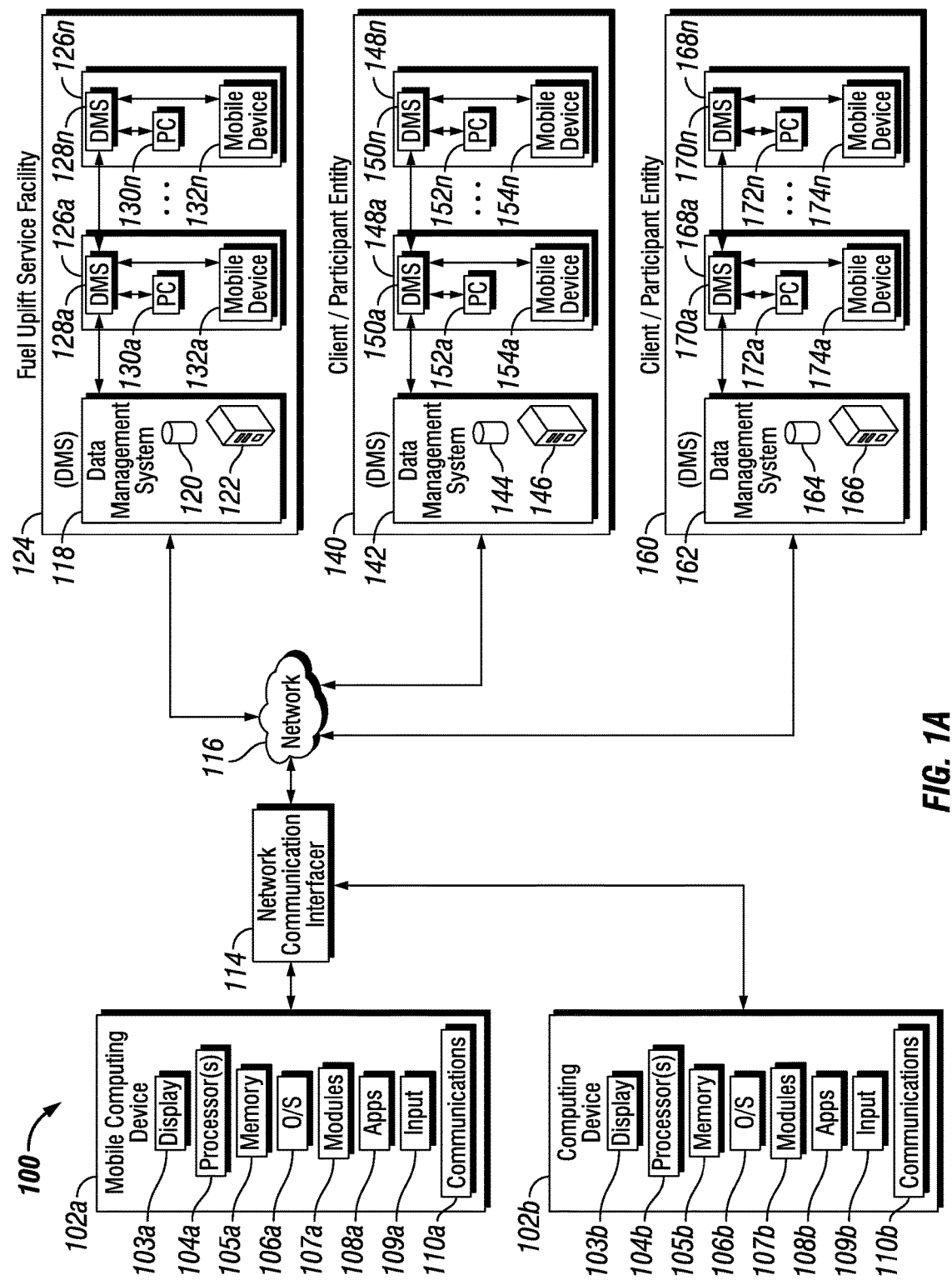
FIG. 1A is a schematic illustration of example system architecture in accordance with various implementations and embodiments of the present disclosure.

Turning now to the detailed description of the preferred arrangement or arrangements of various embodiments of the present invention, it should be understood that, although an illustrative implementation of one or more embodiments are provided herein, the inventive features and concepts can be manifested in other arrangements and that the scope of the invention is not limited to the embodiments described or illustrated. The various specific embodiments can be implemented using any number of techniques known by persons of ordinary skill in the art. The disclosure should in no way be limited to the illustrative embodiments, drawings, and/or techniques illustrated herein, including the exemplary systems, methods and implementations illustrated and described herein.

One embodiment of the present invention will be described with reference to FIG. 1A that shows one example of the type of network environment within which the fuel uplift transaction service and system (hereinafter referred to as the "fuel uplift service") can reside and be utilized. The fuel uplift service can include a system, software and/or platform(s) that can utilize the network environment described herein with reference to FIG. 1A, and various embodiments of the same. As one skilled in the art will appreciate, the fuel uplift service can run on one or more application servers 118 that reside at a host facility 124 and communicate with user devices 102 via network 116. The network 116 can take the form of a LAN (local area network), WAN (wide area network), the Internet, a cellular network that can include one or more satellite relay communication devices, or any other type of network that connects one or more facilities or sites (facility 1 through N located at the fuel uplift service provider, and facilities 140 and 160 that represent remote customer and reseller third-party sites), depending upon the needs of the user and the constraints of the host system. It should be noted that although only two third-party and client facilities 140 and 160 are shown, there can be numerous third-party sites that can be communicably connected to the host facility 124. It should also be noted that although not shown, third parties and fuel uplift service clients can also connect to the fuel uplift service system servers via handheld devices and stand-alone computers that can be, for example, the same type of handheld devices and stand-alone computers as the user devices 102(*a*) and 102(*b*).

These fuel uplift client and third-party computer devices can also have one or more computer software modules installed therein, include a computer software application, or have the capability to connect to a network (e.g., Internet, Intranet) by itself or via another fuel uplift client or third-party computer devices that has access to a network to communicatively connect to one or more fuel uplift service database servers 118,128(*a*)-128(*n*). These fuel uplift client and third-party computer devices can also connect to one or more fuel uplift service database servers 118,128(*a*)-128(*n*) via a website.

The network 116 can also represent a combination of the aforementioned types of networks. For example, a LAN, that connects a company or owner computer system to user computing devices 102(*a*), 102(*b*), can be utilized in with the Internet to connect a company or owner computer system to one or more client computer systems 140 and 160. For example, computer workstations 102(*b*) can be connected to the aforementioned one or more servers, or a single server application can reside within the same workstation with which a user is interacting to input data and receive results from the fuel uplift service. Users can be persons or computers and, in one example of the fuel uplift service, a user is a computer wherein fuel uplift data is viewed thereon and/or fuel uplift data is uploaded from or downloaded to database servers 118,128(*a*)-128(*n*). As used herein, workstations can be a personal computer (PC), as is known in the art, and can execute the associated Mac or Windows programs and/or utilize the respective operating systems (e.g., Windows. RTM, Linux, UNIX, Android, or any operating system (OS) that is compatible with a computing device). The workstations can interact with a network such as a LAN, WAN, or other network that connects computers and servers over communication lines such as, for example, TCP/IP, Ethernet, coax, double-coax, etc.). Other computer and electronic communication devices used alone or in combination, such as tablets, smart phones, fablets, laptops, or any display device that allows a user to enter and display input data, display results and interact with one or more embodiments of the fuel uplift service described herein, can also be used by the fuel uplift service. Examples of mobile user devices 102(*a*) that can be utilized to enter fuel uplift service data, or mobile fuel uplift client and mobile third-party devices that can be used to transmit requests for fuel utilizing the fuel uplift service include Apple iOS products such as an iPhone, iPad and other Apple products. Additionally, Android handheld devices such as Samsung Galaxy phones, Samsung Galaxy tablets and other Android devices made by other manufacturers can also be utilized.

The network environment can also utilize one or more components that reside in a Cloud computing environment such that one or more, or all, of the processing of fuel uplift data (described herein) that is performed by the present invention can reside in a Cloud computing environment as opposed to utilizing an on-site computer device(s). Additionally, the computing devices that either host, execute, display and/or any combination of the aforementioned can act as a thick or thin client device that utilizes a server(s) (e.g., webserver(s)) to host the processing capabilities of the present invention. For example, the workstations can be configured to accept input simulation or processing parameters and, thereafter, access the fuel uplift service stored on one or more of the aforementioned servers for perform other functions and access other capabilities.

As will be described in more detail herein, examples of the types of data that can be input into and, in some instances, generated by the fuel uplift service with the aid of one or more computer user devices described herein can include, for example, one or more of the following: aircraft identification and other authentication information, location information, fuel data and fuel characteristics, equipment data and other equipment identifying information, FAA flight information or foreign equivalents of FAA flight information, and personnel information. For example, users interacting with a personal computing device, such as a handheld device or a workstation, can manually input/select fuel uplift service information that is to be entered into a fuel uplift service interface via data fields, radio buttons, check boxes and/or output data fields that display the input selections, results of data calculations or manipulations based at least in part from the user input data. Alternatively, a user can be a computer device that inputs data into a fuel uplift service interface.

Information input into or determined by the fuel uplift service (i.e., fuel uplift data) can include, for example, the following: 1) the current date and time; 2) the location of the fuel manipulation; 3) the identification of the into-plane agent that is manipulating the fuel; 4) the identifying information associated with the airline; the airplane (e.g., aircraft registration number) and/or the aircraft operator; 6) the fueling location on the airport grounds that can include, for example, a gate number or airport facility code; 7) the volume of the fuel (e.g., uplifted, stored, purchased, sold) to be manipulated in various units of measure (e.g., U.S. gallons, liters, pounds), 8) personnel signatures (e.g., signatures of crew members, fuel agents and/or into-plane agents/personnel); 9) personnel names and/or identification (e.g., names or employee numbers of crew members, fuel agents and/or into-plane agents/personnel); 10) start and stop times of fueling operations; 11) meter readings taken before, after and during fueling operations; 12) notes input by crew members and other fueling operations personnel; 13) reseller information; 14) fuel card information (e.g., number, owner, billing address and/or payment instructions or other billing details); 15) information related to the geographical origin(s) and/or destination(s) of the aircraft or other vehicle; 16) email address of the client, reseller or other relevant persons and/or entities that enable delivery of documents (e.g., delivery ticket); 17) fuel information such as type or other fuel characteristics; 18) information related to the fuel delivery equipment; 19) FAA flight type (e.g., FAA Pt. 91, Pt. 135, etc.) or foreign equivalents of FAA flight information; 20) information concerning the release of fuel or the scheduling of fuel operations including but not limited to the conversion of measurement units that describe the quantities of fuel to be dispensed; 21) information concerning the fuel including specific gravity and/or fuel temperature at the storage site, at the point of transport, and/or within the aircraft or vehicle; and 22) information required for a credit check process and/or methodology. Fuel uplift information in some instances can be input into an interface disposed on a user computing device by a user, or determined by calculations performed on user input data by a computer program running on the user computing device (e.g., a software application), a website accessed by the user's computing device or a remote computing device. In one or more embodiments, fuel uplift information can be acquired by the fuel uplift service from previously stored information accessible via one or more databases that reside on-site or remotely at an owner's site or a customer site.

As is described with reference to FIG. 1A, computers 102(b) and mobile computing devices 102(a) are user devices that can utilize the fuel uplift service. The computers 102(b) can be workstations, PCs, laptops, one or more servers, a desktop computer, a kiosk, etc. The mobile computing devices 102(a) can be a phone, a mobile computer, a tablet, a phablet, a laptop, a smartphone, a tablet computer, a wearable computer that can be a smart watch, a heads-up or head-mounted display, a gaming system, a PDA (personal digital assistant), etc. As described with reference to FIG. 1A, the computing devices 102(a) and 102(b) are used by users of the fuel uplift service to connect to the network 116 via one or more network communication interfaces 114 to transmit and receive information concerning the uplift of fuel. In one embodiment, the computing devices 102(a) and 102(b) can utilize a website to communicatively couple to one or more data management systems (DMS), such as DMS 118, or a DMS system disposed at the user's site to utilize the fuel uplift service.

In another embodiment, the computing devices 102(a) and 102(b) can utilize a software application to communicatively couple to the one or more databases included in a DMS system, whether on-site or disposed remotely from the user computer systems 102, such as DMS 118, to utilize the fuel uplift service. As described with reference to FIG. 1A, one example of the user computer(s) 102(a),(b) can include a display 103(a),(b), one or more processors 104(a),(b), one or more memory devices 105(a),(b), an operating system 106(a), (b), hardware and/or software modules 107(a),(b), one or more software applications 108(a), (b), can be capable of interacting with one or more data input devices 109(a),(b) (e.g., keyboard, mouse, touch screen display, light pen, wired or wireless barcode reader, digital camera, light scanner, optical reader, stylus, etc.), and be configured to receive and transmit data over a network using communications hardware/software 110(a),(b) known to those skilled in the art. Each of the input devices can be wireless or connected to a computing device via a communications wire or cable. The modules 107(a),(b) can reside either on the computing device 102 or on remotely situated computing devices such as DMS 118, 126 to be accessed by the computing device 102. User computers 102 can also communicatively couple to the DMS system 118 remotely using a wired or a wireless communications standard via a network, as those having ordinary skill in the art will appreciate. The DMS systems 118, 126(a)-(n) can include, for example, a web server or a server that is disposed in a remote site and accessible over the network.

The computing devices 102 can be configured by a software application residing on the device and/or by downloading a software application after accessing a website or the fuel uplift service over a network. Once connected, a user can access the one or more DMS systems and databases to transmit, receive and/or update fuel uplift data. The fuel uplift data can be centrally stored in one or more databases, residing within a single DMS 118 or distributed across DMS systems 118, and/or 126(a) to 126(n), and made accessible to computing devices 102. DMS 118 hosts the data that is input into, selected or displayed by the computing devices via the fuel uplift graphics user interface displayed on the computing devices 120 when using the fuel uplift service. DMS 118 also hosts the fuel uplift information that is associated with each user account and corresponding fuel uplift operations. Alternatively, the fuel uplift data can be distributed across databases that reside in the DMS systems 118, and 126(a)-(n) depending upon the available bandwidth and the amount of storage and computing power required by the fuel uplift service to accommodate the required number of users. DMS systems 126(a)-126(n) and their corresponding information systems 130(a)-130(n) and 132(a)-132(n) can reside remotely from one another, or at the same or a different facility owned by the entity that is hosting the fuel uplift service.

The DMS systems 118, 128(a)-128(n) can be, for example, a database server, a virtual server, or any suitable computer or collection of computers that is accessible over a network, runs server software components and executes software capable of managing, distributing, and validating shared electronic files. As discussed herein, the electronic files can also include user credentials. For example, the DMS 118 can manage and store user accounts, authorization credentials, and shared files. DMS 118 can execute software instructions that include one or more security protocols to verify a user's credentials. The DMS 118 also provides authorization credentials to the user computers and/or processing systems for validation. The DMS 118 can include data storage including, for example, a relational database, a non-relational database, and/or flat files for storing data associated with the fuel uplift service. The type of relational databases that can be utilized for a DMS system for one or more embodiments include an Oracle Database, a MS SQL server database, a MySQL database, and a DB2 database. The types of non-relational databases that can be utilized for a DMS system for one or more embodiments include a Hadoop, a MongoDB, a DB40, or an Active Directory. For example, credentials, user accounts and electronic files can be stored in a database 120 that can be accessed by the server 122.

One having ordinary skill will appreciate that although the DMS 118 is pictured as two separate entities (database 120 and server 122), the DMS can be configured to be one machine such as a database server. As utilized herein, the terms "database server" and "DMS" include systems wherein the server and the data storage are separate components, and systems wherein the server, or a virtual server, that runs server software components, includes data storage including, for example, the database and/or flat file components described herein. In one or more embodiments, the DMS systems 118,128(a)-(n) can access additional databases and server systems to retrieve, store, manipulate and manage data to be transmitted over a network to one or more users of the fuel uplift service. In one or more embodiments, the DMS 118 can access the stored credentials and/or user accounts via web services.

For example, network architecture 100, described with reference to FIG. 1A, includes facility systems 126(a)-126(n) that include corresponding DMS systems 128, and a computing device 130 and/or a mobile computing device 132 to communicate with the DMS 128. In another embodiment, one or more of the DMS systems 118 and 126(a) to 126(n) have backup server systems (not shown) that allow the fuel uplift service to continue operating at a capacity that is at or near to a normal capacity when one or more primary DMS systems 118 and 126(a) to 126(n) fail or malfunction. In the exemplary system architecture of FIG. 1A, each information system 130(a)-130(n) and/or 132(a)-132(n) communicates fuel uplift data to each of the DMS 128(a)-128(n) devices which, in turn, can communicate with DMS 118. Additionally, each DMS 128(a)-128(n) can communicate fuel uplift information to the corresponding information systems 130(a)-130(n), which can be a workstation, PC or other computing device, and/or each of the corresponding information systems 132(a)-132(n), which can be a mobile device, via a direct connection or remotely through a network (not shown) that can include, for example, a LAN, a WAN, a WLAN, Intranet, a wireless network, and/or the Internet.

Examples of one or more DMS systems that can be utilized in the fuel uplift service described with reference to FIG. 1A will be described with reference to FIG. 1B. In the example illustrated in FIG. 1B, fuel uplift data can be transmitted over the network 116 from one or more DMS systems 118,128(a)-128(n) and displayed on one or more user devices 102(a),(b). One or more user devices can also receive fuel uplift data from one or more client or participant facilities 140,160 over the network 116. In one or more embodiments, DMS systems 118,128(a)-(n) include a web module 180, a host module 182, a data cache module 184, an accounts invoicing module 186, an accounts payable/receivable module 188, and an inventory monitoring module 190. The DMS system can also include one or more databases or other storage components. For example, in one or more embodiments, DMS system 118 and one or more DMS systems 128(a)-128(n) can include an accounting record database 192 and/or an inventory record database 194. In one or more embodiments, accounting record database 192 and inventory record database 194 can be combined into a single database, be a part of a larger database structure that is accessible by one or more DMS systems, or be distributed across numerous database structures that are accessible by one or more DMS systems.

Although not shown, one or more of the DMS systems 118, 128(a)-128(n) also include a reporting manager module. As discussed herein, one or more of the DMS systems can also include additional modules that function manage and manipulate fuel uplift data transmitted to and stored on one or more DMS systems. The modules included in one or more of the DMS systems can be executed to enable the fuel uplift service to collect, manipulate, process and report fuel uplift data from one or more user devices 102(a),(b), client/participant entities, and other computer devices authorized to access the fuel uplift service over a network. One having ordinary skill in the art will appreciate that numerous modules can be included in one or more embodiments of one or more DMS systems described herein. It will also be appreciated by those having skill in the art that one or more modules discussed herein can be combined into a single module and included in one or more DMS systems. For example, the accounts invoicing module 186 and the accounts payable/receivable module can be combined into one module to perform all the functionality that the two separate modules can otherwise perform.

In one or more embodiments, the web module 180 is implemented as a web application and provides a provides a graphical user interface to one or more authorized users of the fuel uplift service over a network. As explained herein, the web module 180 can also assist in the performance of user validation and authorization procedures that utilize one or more user credentials to allow access to the fuel uplift service via a user device (e.g., the mobile device 102(a) or computing device 102(b)).

The host module 182 can include any number of modules and or applications configured to facilitate the establishment and management of various communication sessions with one or more other components of the fuel uplift service. For example, the host module 182 can include a suitable server component configured to host one or more website pages or other graphical user interfaces accessible by an authorized user over a network using a user device, customer computer and or the computing devices. In one or more embodiments, user requests can be received via the host module 182. In one more embodiments, the host module can include additional modules such as a request processing module that facilitates the processing of received requests and other network communications. The host module can process various types of requests from authorized users of the fuel uplift service including a request to store fuel uplift information in one or more databases, a request to access one or more databases, a request to assist in the collection of fuel uplift data, a request to collect and process fuel uplift data, a request to combine fuel stored, generated and/or other fuel uplift data and generate a document or report. In one or more embodiments, the host manager will also include a reporting manager that will assist in generating reports, associated with one or more processed requests, from information that has been stored, generated, collected and/or otherwise by the fuel uplift service. In or more embodiments, the data cache module 184 enables the fuel uplift service to access and store fuel uplift data that is utilized by other components of the fuel uplift system. For example, in responding to a user request to generate an inventory report, the data cache module 184 retrieves the fuel uplift data from one or more data sources within the fuel uplift system and sends the requested data to other resources required to respond to the request.

Figure 2:
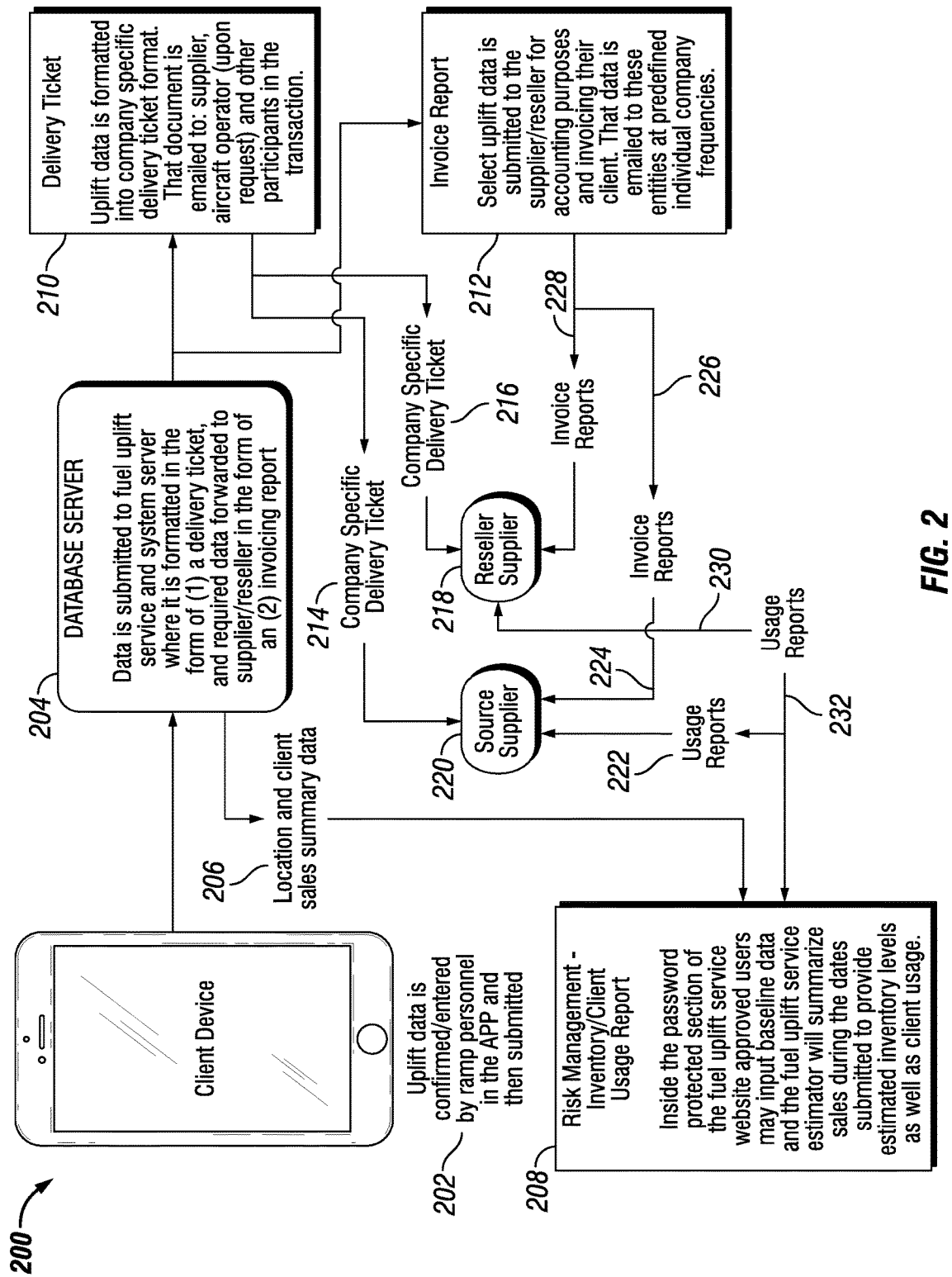
FIG. 2 provides an example of a fuel service system and the functions performed and the steps taken by various implementations and embodiments of the present invention described herein to perform those functions.

FIG. 2 illustrates a process flow chart that describes an example of an implementation of the fuel uplift service system and a logistical process 200 that can be implemented within the fuel uplift service that can utilize the network environment illustrated in and described in association with FIG. 1A. The described process flow chart can be implemented by and represents a collection of modules configured as software code that is executed by one or more processors and/or microprocessors. These modules can run on the DMS 118 or distributed across DMS systems 118, and/or 126(a)-126(n) residing at one or more facilities that host the fuel uplift service. Alternatively, the process flow chart can be implemented by and represents a software application can be resident upon and be executed on user devices 102(a)/102(b) described herein that allows the user devices to interact and communicate with one or more servers 118,128(a)-128(n) to utilize and execute the software application that enables a user to utilize the fuel uplift service. As shown in step 202, a user device, either running a software application or requesting a user interface from a server resident within a DMS, allows a user to input fuel uplift data into the user device via a fuel uplift software interface. Alternatively, a user device can interact with a website via a web server that allows a user to input fuel uplift data into the website. In this case, the fuel uplift information will be transmitted over a network (e.g., the Internet) to the fuel uplift service servers and one or more databases.

In one embodiment of the present invention, the fuel uplift service user interface can provide for a variety of input options using data fields, radio buttons, check buttons, etc. that allow a user to input information that allows the fuel uplift service to generate reports and other documents that are based, at least in part, upon the user input information. The fuel uplift program can use filters to refine the data input into the interface and provide acceptable ranges of input and output data based upon a context in which a user is operating to provide more authentic input and responsive data output in a database or a report. The following Table I provides, by way of example, a list of potential types of data that can be either input/selected by a user or determined by the software program of the fuel uplift service to populate data fields within the graphical user interface and/or the fuel uplift service database server (DMS 18):

TABLE I

DATA FIELDS FOR FUEL UPLIFT DATA
GUI AND/OR DMS DATA FIELD TYPES

| | |
|---|---|
| Uplift Date & Time | Number Fields with Conversion Fields; Text Boxes; Scroll Down Menus; or a Combination of these; Filters to protect against impossible or incorrect entries |
| Current Date & Time | Number Fields with Conversion Fields; Text Boxes; Scroll Down Menus; or a Combination of these; Filters to protect against impossible or incorrect entries |
| Location (IATA/ICAO) | User Pop-up Menu Selection Fields; Filters to protect against impossible or incorrect entries |
| Into-plane Agent | Fields; Text Boxes; Scroll Down Menus; or a Combination of these |
| Airline/Aircraft operator name | Fields; Text Boxes; Scroll Down Menus; or a Combination of these |
| Gate # or fueling location information | Fields; Text Boxes; Scroll Down Menus; Number Fields; or a Combination of these |
| Volume in USG, or liters, or pounds | Number Fields with Conversion Fields; Filters enabled that protect against impossible or incorrect entries based upon type of aircraft, historical fuel data, destination data, and/or additional data |
| Flight Type | Number Fields; Text Boxes; Scroll Down Menus; or a Combination of these Filters to protect against impossible or incorrect entries |
| Aircraft registration or other identification | Number Fields; Text Boxes; Scroll Down Menus; or a Combination of these Filters to protect against impossible or incorrect entries |
| Aircraft type | Number Fields; Text Boxes; Scroll Down Menus; or a Combination of these Filters to protect against impossible or incorrect entries |
| Flight number | Number Fields; Text Boxes; Scroll Down Menus; or a Combination of these Filters to protect against impossible or incorrect entries |
| Signature of crewmember | Text Box; Fields; Touchscreen Fields; Images |
| Name of crewmember | Fields; Text Boxes; Scroll Down Menus; or a Combination of these |
| Fuel Supplier Identification | Fields; Number Fields; Text Boxes; Scroll Down Menus; or a Combination of these |
| Fuel Supplier Address | Fields; Number Fields; Text Boxes; Scroll Down Menus; or a Combination of these |
| Fuel Supplier Contact Information | Fields; Number Fields; Text Boxes; Scroll Down Menus; or a Combination of these |
| Bar Code Information | Fields; Number Fields; Scanning Fields; Text Boxes; Touchscreen Fields |
| Fueling start & stop time | Number Fields with Conversion Fields; Filters enabled that protect against impossible or incorrect entries based upon type of aircraft, historical fuel data, destination data, and/or additional data |

TABLE I-continued

DATA FIELDS FOR FUEL UPLIFT DATA
GUI AND/OR DMS DATA FIELD TYPES

| | |
|---|---|
| Fuel start & stop meter readings | Number Fields; Text Boxes; Scroll Down Menus; or a Combination of these |
| Crew notes | Text Box enabling entries of up to a predetermined number of text and numerical characters, entry of links or reference to additional information |
| Reseller if applicable | Fields; Text Box; Scroll Down Menus; or a Combination of these |
| Fuel card number if presented | Number Fields; Text Boxes; Scroll Down Menus; or a Combination of these |
| Origination | User Pop-up Menu Selection Fields Filters to protect against impossible or incorrect entries |
| Next destination | User Pop-up Menu Selection Fields Filters to protect against impossible or incorrect entries |
| Client e-mail address for a copy of delivery ticket | Fields; Text Box; Scroll Down Menus; or a Combination of these Filters to protect against impossible or incorrect entries |
| Product | Number Fields; Text Boxes; Scroll Down Menus; or a Combination of these |
| Product (Avgas) | Number Fields; Text Boxes; Scroll Down Menus; or a Combination of these |
| Fuel type | Data Fields; Scroll Down Menus; Filters enabled that protect against impossible or incorrect entries based upon type of aircraft, historical fuel data, destination data, and/or additional data |
| Fuel delivery equipment | Data Fields; Scroll Down Menus; Filters enabled that protect against impossible or incorrect entries based upon type of aircraft, historical fuel data, destination data, and/or additional data |
| Fuel Delivery Equipment Number | Number Fields; Text Boxes; Scroll Down Menus; or a Combination of these |
| FAA flight type (FAA Pt. 91, Pt. 135, etc.) or Foreign equivalents to FAA flight type and information | Data Fields; Scroll Down Menus; Filters enabled that protect against impossible or incorrect entries based upon type of aircraft, historical fuel data, destination data, and/or additional data |
| Fuel release, Fuel schedule information | Number Fields with Conversion Fields; Filters enabled that protect against impossible or incorrect entries based upon type of aircraft, historical fuel data, destination data, and/or additional data; Filters enabled that allow for the importation of information from other referenced links, references, documents, reports, etc. |
| Fuel Specific Gravity and Fuel Temperature | Number Fields with Conversion Fields; Filters enabled that protect against impossible or incorrect entries based upon type of aircraft, aircraft data, historical fuel data, and/or additional data |
| Credit check methodology | List of Selectable Options; verified, unverified, incomplete, pending; Filters to initiate credit check processing credit card processing entities |
| Credit Card Number | Fields; Number Fields |
| Card Expiration Date | Fields; Number Fields |
| Tax Information | Number Fields; Data Fields; Scroll Down Menus; Filters enabled that protect against impossible or incorrect entries based upon tax codes, jurisdiction, location |

The above-provided data fields and data types are merely exemplary and not intended to foreclose the list of relevant data and data entry possibilities that can be utilized to enter relevant fuel uplift data and information into the fuel uplift data system and service using a graphical user interface operating on a fuel uplift software platform.

A user inputs the relevant fuel uplift data into the fuel uplift software program via a software interface that includes one or more of the fields, entry data fields, radio buttons, selection menus, and filters described herein with reference to Table I. During these user operations, a user can be communicatively coupled to one or more database servers included within DMS 118 and/or DMS systems 128(*a*)-128(*n*) at step 204 to transmit information associated with one or more of the data fields. During a fuel uplift service session, a user can be required to populate certain fields that are required by the fuel uplift service to determine certain other fuel uplift information based, at least in part, upon user input information. The fuel uplift service data can be transmitted via network 116 in step 204 to one or more database servers 118, and/or 128(*a*)-128(*n*) in real-time, after certain data fields are populated or a combination of both.

FIGS. 6A through 6F provide examples of graphical user interfaces (GUI) that can be accessed by an authorized fuel uplift service user via a user device 102(*a*),102(*b*) to enter fuel uplift data for an aircraft. FIGS. 6A through 6C illustrate examples of data fields that can be provided for a commercial air transport fuel uplift operation. Similarly, FIGS. 6D through 6F illustrate examples of data fields that can be provided for a business air transport fuel uplift operation. The graphics interfaces depicted in FIGS. 6A through 6F do not include all of the types of data associated with commercial and business air transport fuel uplift operations, respectively, or include all of the mechanisms (e.g., radio buttons, drop-down menus, text input fields, tabular entries, etc.) for entering fuel uplift data but are instead intended to illustrate an example of a GUI that can allow a user to interact with the fuel uplift service system to store fuel uplift data and have other relevant information generated by the same. Although illustrated as separate GUIs, one or more of the user graphic interfaces or one or more data fields depicted in FIGS. 6A-6F can be combined to form a GUI on a user device display.

The user graphics interfaces illustrated in FIG. 6A through 6C contain a plurality of data fields 602(*a*) through 602(*n*) wherein a user can use an input device (e.g., mouse, keyboard, stylus, pen, touchscreen, light pen, interactive selection computer device, etc.) to enter text (e.g., data fields 602(*a*), 602(*c*), 602(*e*), 602(*h*)-602(*j*) and 602(*m*)), select from a pre-determined list one or more data items residing in a data structure (e.g., data fields 602(*b*), 602(*d*), 602(*f*)-602(*g*), and 602(*k*)), and select a check-box provided to enable a user to indicate a pre-determined condition or indicate that a condition was satisfied (e.g., data fields 602(1) through 602(*n*)). Once a user inputs the relevant information, the information can be transmitted to the fuel uplift service data servers for storage and management either automatically or once the authorized user submits the input information. As is seen with reference to FIGS. 6A through 6C, fields that can allow a user to input text include, for example, "Crew Member," "Airport," "Registration," "Meter Reading Start," "Meter Reading Stop," "Volume" and "Crew Notes."

The fuel uplift service can be configured such that each of the data fields can accommodate a range of text characters, a specific type of text characters, a specific configuration of text characters or any combination of the aforementioned to provide some measure of protection against incorrect data entries and data entries that are not recognized by the fuel uplift service data servers that receive, store and manage the input fuel uplift data via the user device GUIs. For example, the data field "Airport" can only accept FAA or the Foreign equivalent of airport codes that can have a specific range or specific configuration (e.g., dashes, capital letters, etc.) of text characters. Additionally, for example, the data field "Crew Notes" can be configured to accept an entry of up to 250 text characters. The graphics interfaces of FIGS. 6A through 6C can also contain a plurality of selectable entries provided by drop-down menu mechanisms allocated to providing on-click selectable data entries once the menu is expanded to show the selectable text entries. The categories of information that utilize expandable drop-down menus, as described herein with reference to FIGS. 6A through 6C, can include, for example, "Supplier," "Airline," "Reseller," Fuel Type" and Delivery Equipment." In these examples, once an arrow is selected by a user using a data input device, a data structure such as, for example, a table that includes text entries that are each selectable using the data input device will be provided to the user. In other embodiments, the "Supplier," "Airline," "Reseller," Fuel Type" and Delivery Equipment" categories of information can be configured, for example, as text boxes that allow for a user to enter text to identify the same. In this example, once the text is input into the field, if the fuel uplift service determines that the entry is incorrect, an error message in the form of a text message, an audible warning or some combination of the aforementioned can be utilized to notify the user of the improper entry. The fuel uplift service can be configured to prevent the erroneous data from being stored in one or more of the DMS systems 118, 126(*a*)-126(*n*).

For example, the fuel uplift service can be configured to provide drop-down menus for the "Supplier," "Airline," "Reseller," Fuel Type" and Delivery Equipment" categories. In this example, if a user selects the arrow associated with the GUI data item "Supplier" described with reference to FIG. 6A, a table of Supplier entities that are associated with a particular fuel uplift operation will appear in a configuration such that each information item residing in the data structure can be selected by a user to populate the field associated with the "Supplier" data field. The drop-down menus associated with the remaining relevant data fields "Airline," "Reseller," Fuel Type" and "Delivery Equipment" illustrated in FIGS. 6A through 6C provide user selectable data items residing in a data structure that includes the names of airline entities, fuel reseller entities, fuel types, and delivery equipment, respectively, that can be selected to populate the associated data fields. Furthermore, the GUIs of FIGS. 6A through 6C can also include, for example, selectable information items in the form of check boxes, including the selections for the data fields entitled "Water Check was performed" at 602(1) and "I have reviewed and agree with the data entered" at 602(*n*). The GUI also provides an authorized user with edit buttons 606(*a*) through 606(*n*) described with reference to FIGS. 6A through 6C that are associated with data fields 602(*a*) through 602(*n*), respectively. Each of the buttons marked "EDIT" can be selected by an authorized user to enable the user to edit the text entry, information item selection, and/or check box selection input by a user after that user has performed a data entry action (e.g., text entry, selecting a data item from a drop-down data structure, or a check box selection).

The diverse types of data fields (e.g., text entry, drop-down menu, check box, radio buttons, check boxes, etc.) that can be associated with the categories of information described with respect to the FIGS. 6D through 6F work in a similar manner to the data fields described with reference to FIGS. 6A through 6C. For example, a user can use an input device (e.g., mouse, keyboard, stylus, pen, touchscreen, light pen, interactive selection computer device) to enter text (e.g., data fields 612(*a*), 612(*c*)-612(*e*), 612(*i*), 612(*k*)-612(*m*), 612(*o*)-612(*p*), and 612(*r*)-612(*s*)), select from a pre-determined list one or more data items residing in a data structure (e.g., data fields 612(*b*), 612(*f*)-612(*h*), 612(*j*), and 612(*n*)), and select a check-box provided to enable a user to indicate a pre-determined condition or indicate that a condition has been satisfied (e.g., data fields

612(q) through 612(t)). With reference to FIGS. 6D through 6F, each of the data fields associated with the "Crew Member," "Airport," "Aircraft Operator," "Registration," "Card Number," "Meter Reading Start," "Meter Reading Stop," "Volume," "Next Destination," "Client Email" and "Crew Notes" information categories can be programmed to accommodate a range of text characters, a specific type of text characters, a specific configuration of text characters or any combination of the aforementioned to provide some measure of protection against incorrect data entries or data entries that are not recognized by the fuel uplift service DMS systems.

For example, in one or more embodiments, the GUI can be configured to utilize drop-down menus to enable a user to input information into the data fields associated with the categories for "Supplier," "Flight Type," Reseller," "Card Type," "Fuel Type" and "Delivery Equipment." In this example, similar to data fields 602(b), 602(d), 602(f)-602(g), and 602(k) illustrated in FIGS. 6A through 6C, drop-down menus associated with the categories "Supplier," "Flight Type," Reseller," "Card Type," "Fuel Type" and "Delivery Equipment" provide user selectable data items residing in a data structure that includes the names of fuel supplier entities, flight types, fuel reseller entities, credit card types, fuel types, and delivery equipment, respectively, that can be selected to populate the associated data fields. Additionally, data field 612(s) allows for an authorized user to either input an electronic signature, use text to sign by permission, or can be configured to allow an authorized user to use a stylus to input his/her signature into a provided area on the GUI screen. The GUIs of FIGS. 6D through 6F can also provide check-box data fields for the categories entitled "Water Check was performed" 612(q) and "I have reviewed and agree with the data entered" 602(t) to enable one or more authorized users, depending upon the authorizations required to enter information into that particular data field, to indicate a pre-determined condition or other condition was satisfied. The GUIs illustrated in FIGS. 6D through 6F also provide an authorized user with edit buttons 616(a) through 616(t) that are associated with data fields 602(a) through 602(t), respectively. In the example above, each of the buttons entitled "EDIT" can be selected by an authorized user to edit the text entry, information item selection, and/or check box selection input by the user once the user performs a data entry action (e.g, text entry, selecting a data item from a drop-down data structure, or a check box selection). This is similar to the functionality associated with the "EDIT" buttons described with reference to FIGS. 6A through 6C.

In one or more embodiments of the present invention, one or more software modules can be executed by one or more processors when a user interacts with the fuel uplift service to manipulate and process data stored in one or more databases included in a DMS system 118, 128(a)-128(n). For example, as described with reference to FIG. 1B, one embodiment of the fuel uplift service system utilizes at least one DMS system 118 and/or DMS systems 128(a)-128(n) that include an account invoice module 186. The account invoice module 186 comprises code configured to be executed by a processor included in the DMS system to request, manipulate, generate and/or process invoicing data including sales transaction data, fuel product data and fuel uplift service data. The fuel product data can include, for example, any data that describes the fuel products utilized in fuel uplift operations including type, quantity, and pricing data for the fuel products. Fuel uplift service data can include any data that describes the fuel uplift services offered by a service provider including, for example, pricing, discounts and any payments associated with fuel uplift equipment, fuel uplift personnel, labor, man-hours, duration of equipment usage, or one or more services offered by the fuel uplift service company. The account invoice module 186 is configured to take this information and generate invoicing information and fuel uplift service data and associate the same with a client of the fuel uplift service. The accounting and invoice information can be stored in one or more specific data sets stored in the one or more databases, such as, for example, one or more invoicing records stored in an accounting record database 192 included in the DMS system. The accounting and invoice information stored in one or more databases is part of the accessible fuel uplift information that can be utilized by the fuel uplift service to execute one or more functions of the fuel uplift service.

Figure 1B:
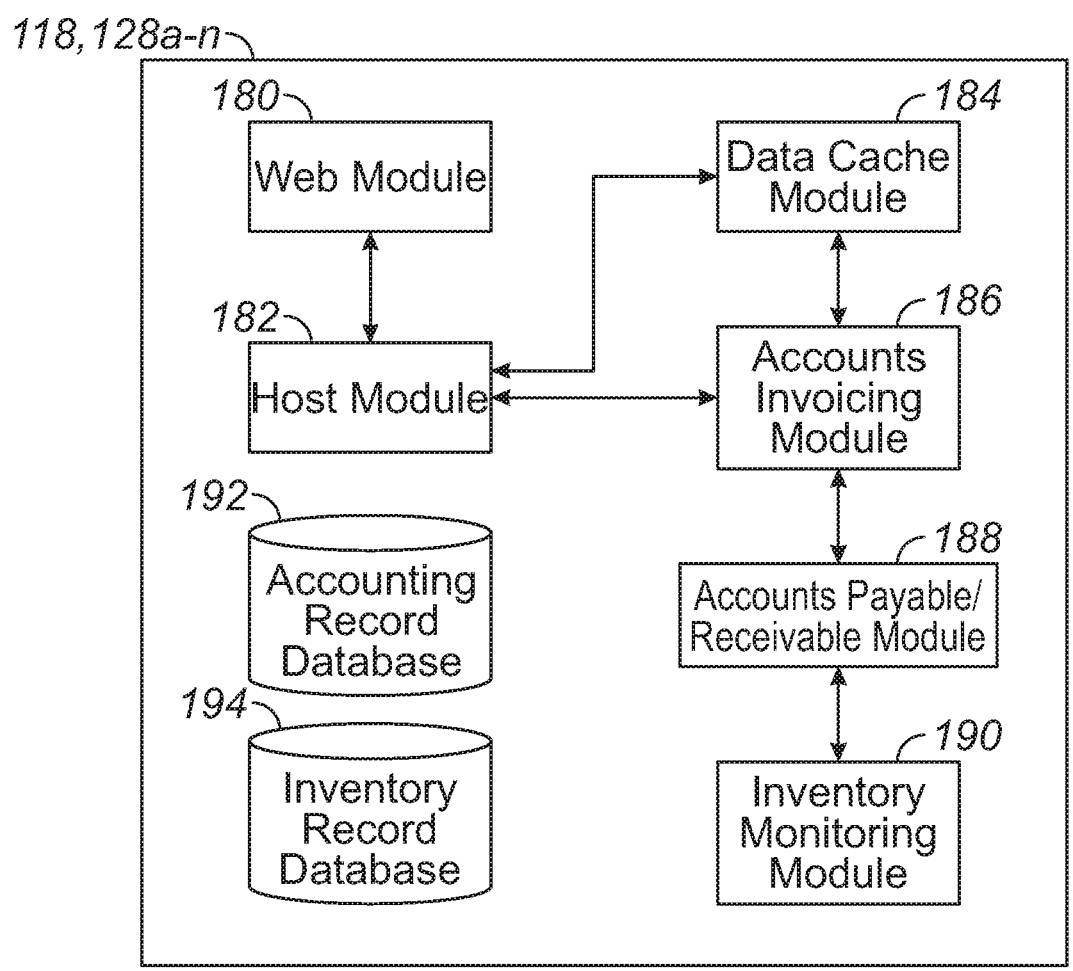
FIG. 1B is a schematic illustration of example system architecture in accordance with various implementations and embodiments of the present disclosure.

One or more embodiments of the fuel uplift service can include additional accounting software modules, all of which are not shown in FIG. 1B for the sake of simplicity, that are configured to assist with the accounting functions performed by the fuel uplift service. For example, accounting invoice module 186 can interact with additional software modules including an accounts payable and accounts receivable module 188, a general ledger module (not shown), payroll module (not shown) and a trial balance module (not shown). One or more of the aforementioned modules can also be configured to function as an accounting information system.

In one or more embodiments, once the necessary fuel uplift information concerning an invoice is collected and/or generated, the reporting manager can generate an invoice (e.g., a sales invoice, a purchase invoice) that includes at least a portion of the fuel uplift information that includes invoicing and accounting information along with other information concerning a fuel service client, fuel provider and/or fuel purchaser. In one or more embodiments, the reporting manager can utilize a pre-fashioned template. In other embodiments, the reporting manager can generate a reporting template based upon user preferences that include the types of information, the format (e.g., sentences, paragraphs, graphic illustrations, tables, spread sheet, etc.) and/or the configuration of the information that is to be included in the report. An authorized user can also select the type of invoicing report to be generated (e.g., purchase invoice, sales invoice, rental invoice, etc.). Once the template is generated, the reporting manager will populate the data fields included in the template with the appropriate information.

An invoicing report can include, for example, one or more of the following: company identification information (e.g., name, address, phone number, fax number, etc.); a date of the invoice; seller/buyer identification information; a unique reference identifier; tax information; credit information; company registration information; tax registration information; description of the goods/services provided (e.g., fuel products, fuel uplift operations, equipment utilized, personnel time and descriptions, etc.); date that goods/services were delivered; tracking information; payment terms; pricing of the products (e.g., unit pricing of fuel products in gallons/liters/lbs., kilograms, etc.); total amount due; currency type; etc.

One or more of the DMS database(s) 120 disposed within one or more DMS systems 118 and/or DMS systems 128(a)-128(n) include addressable areas of data storage that can be part of a larger database or configured as numerous databases accessible by one or more processors within the DMS systems. For example, the DMS database(s) 120, described herein with reference to FIG. 1B, is configured to include an accounting record database 192 that stores retrievable data utilized by the accounting module 186. Similarly, one or more embodiments of the fuel uplift service include a DMS database(s) 120 that is configured to include an inventory record database 194 or other databases depending upon the functionalities and system requirements of the fuel uplift service. Access to the DMS database(s) 120 disposed within one or more DMS systems 118 and/or DMS systems 128(*a*)-128(*n*) can be restricted by one or more security conventions described herein.

As described herein, each of the modules utilized by the fuel uplift service comprises software code and is configured to be executed by one or more processors included in the DMS system 118 and/or DMS systems 128(*a*)-128(*n*) to perform functions that include manipulating and processing the fuel uplift data. For example, in one or more embodiments of the present invention, described with reference to FIG. 1B, the DMS system 118 and/or DMS systems 128(*a*)-128(*n*) can also include an electronic spreadsheet inventory monitoring module that is a part of the inventory monitoring module 190. In one or more embodiments, the inventory monitoring module 190 is configured to manage and control a fuel supplier's inventory of one or more fuel products. For example, the inventory monitoring module 190 can be configured perform supply chain management, uplift operational control, and customer preference control. The inventory monitoring module 190 utilizes the fuel uplift information to manage the flow of fuel products and services, and the movement and storage of fuel products from a seller of fuel products to the point of consumption (e.g., airport facilities). In one or more embodiments, the inventory monitoring module 190 includes tools for inventory cost management, lead-time variability and management of fuel products, fuel product inventory optimization, fuel product inventory tracking and forecasting, multiple inventory location management, and replenishment of fuel products (e.g., relocation of fuel products, purchase orders).

Figure 3:
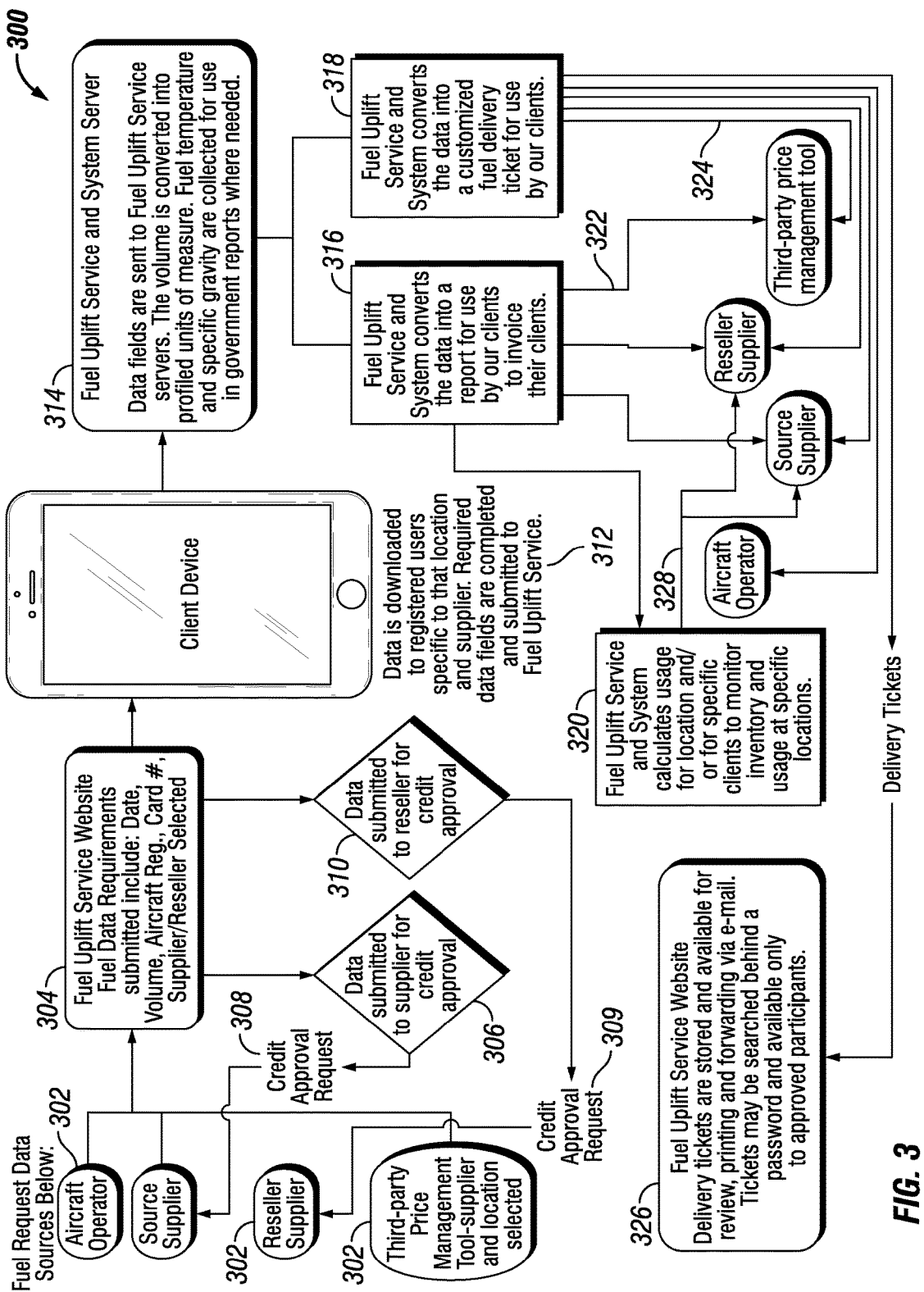
FIG. 3 provides another example of a fuel uplift service system and the functions performed and the steps taken by various implementations and embodiments of the present invention described herein to perform those functions.

For example, the inventory monitoring module 190 can be configured to request a specific data set, such as an invoicing record, from an inventory record database 194, according to steps 204, 210 and 316, 318 described in more detail herein with reference to FIGS. 2 and 3, respectively. The electronic spreadsheet inventory monitoring module can be configured to utilize a proprietary electronic spreadsheet platform such as, for example, Microsoft Excel, iWork Numbers, LibreOffice, Lotus 1-2-3, Lotus Symphony, Google Sheets, OpenOffice, VisiCalc or another electronic spreadsheet platform that can be configured to be operate on the DMS systems of the fuel uplift service system. In one embodiment, the inventory monitoring module 190 can also include or utilize other modules (not shown) including one or more of a transaction number and tracking module, a barcode module, a fuel provider lot and expiration date tracking module, a barcode printing module, an item imaging module, one or more category modules, a unit conversion and measurement module, a pricing and measurement and discount conversion module, a currency conversion and manager module, a scheduling and tax provision module, a product alias and coding module, a location code module, and an audit and inventory level management module.

In one or more embodiments, once the necessary fuel uplift information concerning the inventory of a fuel supplier's fuel products is collected and/or generated, the reporting manager can generate an inventory report that includes at least a portion of the fuel uplift information that includes inventory information along with other information concerning a fuel service client, fuel provider and/or fuel purchaser. In one or more embodiments, the reporting manager can utilize a pre-fashioned template. In other embodiments, the reporting manager can generate a reporting template based upon user preferences that include the types of information, the format (e.g., sentences, paragraphs, graphic illustrations, tables, spread sheet, etc.) and/or the configuration of the information that is to be included in the report. An authorized user can also select the type of inventory report to be generated (e.g., forecast report, report that reflects an actual amount of fuel products a fuel provider has on hand at the close of an accounting period, perpetual inventory control reports that utilize an initial measurement of fuel products and monitors additions and deletions of fuel products as they occur, etc.). Once the template is generated, the reporting manager will populate the data fields included in the template with the appropriate information.

One or more embodiments of the fuel uplift service includes a transaction number and tracking module. The transaction number and tracking module manages transaction numbers associated with the entry of customer orders, fuel products, the function of uplifting fuel into an aircraft, and the utilization of accessories and/or assets utilized in association with any of these activities. The transaction number and tracking module tracks and manages these transaction numbers from the time the transaction numbers are issued and received into inventory, to the time the transaction numbers are tagged as obsolete and no longer viable. The transaction numbers can be permanently recorded in the system, allowing inventory control personnel access to a wealth of historical and validation information. The transaction numbers can be utilized for any number of uses including government and client compliance requirements, insurance, recall management, and warranty.

One or more embodiments of the fuel uplift service includes a barcode printing module. The barcode printing module allows for 2-dimensional barcode imaging that is customizable to meet the barcode requirements of the fuel providers and the customers. For example, the images can be captured using a user device 102, such as a mobile user device 102(*a*) or computing device 102(*b*), as described herein, that includes a barcode scanner as one of the input devices 109(*a*),(*b*) to capture the barcode image. Once captured, the image can be transmitted to a DMS system to be stored and processed by the fuel uplift service.

One or more embodiments of the fuel uplift service includes an imaging module. The imaging module allows a user of the fuel uplift service to store pictures/images of certain interactions and/or fuel uplift activities including, for example, the account number associated with payment activities for the fuel and/or related fuel uplift activities, meter readings, various visual indicators, credit cards, or any event that can be captured on an image receiving device (e.g., digital camera). For example, the images can be captured using a user device 102, such as a mobile user device 102(*a*) or computing device 102(*b*), as described herein, that includes a digital camera as one of the input devices 109(*a*),(*b*). Once captured, the image can be transmitted to a DMS system to be stored and processed by the fuel uplift service. The images can be displayed on each report, invoice, or output of the system as needed. Digital images of meter readings and other measured fuel uplift activities can be converted to actual numerical representations using optical character recognition software that is known to persons having ordinary skill in the art. In one or more embodiments, the fuel uplift service is configured to utilize Apple Pay, Google Wallet or other proprietary platforms as the part of the imaging module to facilitate the payment for fuel uplift service and associated services and activities.

One or more embodiments of the fuel uplift service includes a category module. The category module allows a user of the system to add various categories and create sub-categories to provide additional inventory items and fuel lot sorting capabilities to the fuel uplift service. The system allows for the creation of item category trees including numerous levels of sub categories per item under a single category. For example, a GUI displayed on a user device 102 can include data fields that are associated with inventory items such that information associated with the same can be entered into the fuel uplift service such that the information can be saved, manipulated and processed. The creation of item category trees assists in managing these inventory items and in the creation of information that can be included in any reports or documents that include information concerning the inventory items.

One or more embodiments of the fuel uplift service includes a unit conversion module. The unit conversion and measurement module tracks and manages the units of measurement required for fuel uplift, receipt and delivery functions and associated services. For example, a lot of fuel can be received by a fuel supplier or customer in kilograms. Due to the fuel uplift requirements of the fuel uplift service, airport or aircraft, requirements may call for the fuel to be dispensed, measured or recorded in liters, pounds or gallons. Therefore, the relationship between units of measurement of volume and the relationship to a unit of volume to a unit of weight for a particular type of fuel are utilized by the fuel uplift service such that the required conversions can be determined by the fuel uplift service system and stored, manipulated or reported.

One or more embodiments of the fuel uplift service includes a pricing, measurement and discount conversion module. The pricing, measurement and discount conversion module allows a user to assign unique pricing structures and levels to a type, quantity and grade of fuel, assign a unique price scheme to a customer including percentage price discounts based on the volume of fuel products purchased, assign and manage vendor specific pricing for the fuel supplied by multiple vendors, and produce customer and/or product specific price schedules.

One or more embodiments of the fuel uplift service includes a currency conversion and manager module. The currency conversion and manager module uses preferences, and user and customer requirements to convert one currency to another. The currency conversion can be performed for fuel transactions occurring in real-time or for planned transactions that will occur in the future by relying on currency valuation and market data for the relevant time period or utilizing historical markers for forecasting functions. This module has the capability to perform currency accounting functions, currency management and track multiple transactions across a location, a fuel type, a particular lot of fuel, and one or more aircrafts in different currencies to assist in the purchasing, selling, and uptake of fuel products for customers and vendors that utilize the same or different currencies.

One or more embodiments of the fuel uplift service includes a scheduling and tax provision module. The scheduling and tax provision module tracks and manages the uptake, purchasing and selling of fuel products in different aircraft staging locales and airports, states, counties, and countries that collect the fees and taxes for the relevant business activities. The schedules, fees and tax codes associated with each jurisdiction and locale are referenced and utilized such that an invoice for a particular customer or purchaser reflects the current fee, tax and sales information.

One or more embodiments of the fuel uplift service includes a product alias and coding module. The product alias and coding module gives a user the capability of assigning fuel products and associated equipment aliases that can be different from the official identifier of the fuel product or uptake service that is the focus of the transaction. One or more aliases can be associated with a product, a customer and a vendor depending upon the needs of the user, customer or vendor.

One or more embodiments of the fuel uplift service includes a location code module. The location code module utilizes airport location codes, warehouse codes, airport aircraft staging codes and fuel storage bin codes to manage and track fuel products, aircraft, fuel uplift activities and services, and other equipment and activities associated with the same. These codes can be codes assigned by a governing authority or assigned to one or more of the aforementioned products, equipment and activities to give a user the flexibility to track and manage the transfer the products, equipment, services and activities, etc. from one location to another.

One or more embodiments of the fuel uplift service includes an audit and inventory level management module. The audit and inventory level management module enables a user to manage, track and process inventory levels of fuel products at locations where fuel products are stored for customer and vendor use and dispensed during fuel uplift operations.

In one or more embodiments of the present invention, modules utilized by the fuel uplift service can be part of a software application that is running on a user device 102, an on-site server interacting with the user device, or running within DMS 118 and/or DMS systems 128(a)-128(n). Alternatively, a user can input fuel uplift data into a website configured by a webserver that is communicatively coupled to DMS 118 and/or DMS systems 128(a)-128(n) to gather the information required to prepare a delivery ticket, fueling report, invoicing report, other related fuel uplift documents, etc. In one or more embodiments, the fuel uplift service utilizes a web page to allow users to interact with the fuel uplift service. A web server can be included within DMS 118 and/or DMS systems 128(a)-128(n) to distribute the web pages of the fuel uplift service that assist users in uploading, storing, managing and distributing fuel uplift data. In another embodiment, a web server is included in computer devices 102(b). In this embodiment, the mobile devices 102(a) also include a mobile web server that is included in the mobile devices 102(a).

At step 204, during the communication session between a user and the fuel uplift service database servers 118,128 and after the fuel uplift data has been entered and transmitted to the fuel uplift service, the fuel service data is submitted to the fuel uplift service and stored to the database server(s) 118,128 where it is organized and formatted into one or more databases associated with the servers. The fuel uplift data input and/or generated during the communicative session is manipulated by the fuel uplift service server or servers 118,128 and formatted to form various reports, graphics, charts, tables, lists, and/or a combination of these. These various reports, graphics, charts, tables, lists, and/or a combination of these can be transmitted back to the user devices 102, or transmitted to one or more devices 142,148(a)-148(n),162, 168(a)-168(n) that are resident at fuel uplift client facilities 140,160, or at any other facility or locale where a user of the fuel uplift service can access the system over a network.

For example, as described with reference to FIG. 2, the database server(s) 118,128 can format the fuel uplift information to generate a fuel delivery ticket at step 210. In this embodiment, different client entities 140 and/or 160 such as fuel companies, aircraft companies, fuel providers, processors and resellers, etc. can have different requirements, formats and procedures that impact what information is required to be included within a delivery ticket. These requirements can affect how that information is to be displayed and emphasized, and what information is not to be included in a delivery ticket depending upon the person(s) that has access to the delivery ticket, the person(s) that requested that a delivery ticket be generated, the recipient(s) of the delivery ticket, and the purpose for generating the delivery ticket. The database server(s) 118,128 can format the fuel uplift information to generate a fuel delivery ticket that is specific to each client company 140,160 and each of these client company needs. Once the delivery ticket has been generated, the delivery ticket can be sent to client entities 140,160 to include an aircraft operator, fuel supplier or other entities automatically or upon requests via network 116. The client entities 140,160 can also access the fuel uplift service database servers 118,128 via network 116 to obtain a delivery ticket. Alternatively, client entities 140,160 can utilize a website that allows for the requests and/or display of a delivery ticket generated by the database server(s) 118,128. For example, a company specific delivery ticket can be sent to a specific client company, such as a source supplier, at step 220, or a reseller supplier at step 218. The delivery ticket can be transmitted via email, fax, text message, or other suitable electronic means. The fuel uplift service can also be configured to send out reports and other information on a predetermined periodic basis that can be determined by the fuel uplift service clients, or by the fuel uplift service that has been programmed to meet a one or more of a particular client's needs or to meet certain predetermined criteria. Charts and graphs summarizing fuel purchases, deliveries, orders, payments received, acquisitions, postponements, cancellations, order changes, or other information concerning fuel transactions can be generated by the fuel uplift service. The fuel uplift service can generate data including graphical data to summarize fuel uplift activities over one or more temporal periods (e.g., minute(s), hour(s), day(s), week(s), month(s), year(s)), for one or more geographical regions, airports, aircraft operators, clients, fuel providers, fuel purchasers and other middle entities, and other entities. In so providing, relevant data can be compared across clients, locations, aircraft, etc. to assist a user to manage fuel uplift activities including inventory, accounting procedures, pricing, tracking procedures, selling, buying, procuring, etc.

In one or more embodiments, once the requisite data is entered into the fuel uplift data fields and received by the fuel uplift servers, a user will receive an electronic notice or message via an email, text or by some other electronic means that the fuel uplift data submission was successful. If a problem arises with any of the information that was submitted to the fuel uplift service server(s), an error message can be sent with an accompanying error code that is associated with a particular submission error detailing what the problem was with the submission. In another embodiment, the error can be a generalized error notification that does not include any information specific to any data submissions. The errors can be of the type of a temporal error, geographical error, data entry error, error with an operation of a computer device utilized in the transmission path or other system error. The errors can also be due to storage or management of the fuel uplift submitted data, or any other type of error that can prohibit the successful transmission, storage and management of the fuel uplift service data. The types of system error codes are well known in the art and will not be discussed in detail herein.

For example, in one embodiment, the fuel uplift service system can issue an error due to the entry of an incorrect airport code. In this embodiment, the fuel uplift service compares one or more of GPS (global-positioning system) data associated with a user device 102 utilized to enter fuel uplift information at the site of the fuel uplift operations, an aircraft itinerary for which fuel uplift operations are associated and other aircraft location data to an airport code entry to trigger the transmission of an error code to one or more of the relevant user device(s), administrator(s), and aircraft operator. Error codes can also be issued for fuel type and aircraft type. For example, aircraft fuel type data can also be compared to data indicating the type of aircraft being serviced either in the fuel uplift service data management server(s) or in the relevant user device. For example, if the aircraft fuel type does not match the type of aircraft that is being serviced, or if the amount of fuel scheduled for uplift does not match the space requirements of the aircraft, an error message can be displayed on the user device, communicated to an administrator, communicated to an aircraft operator, and/or communicated to one or more users. In addition to the error code, a detailed message detailing the error can also be communicated to one or more of a user, aircraft operator and administrator. For example, if an error code is generated by a user device or a fuel uplift service DMS system due to incorrect fuel delivery equipment at the service site, a message detailing the same can be communicated to one or more authorized entities. The missing or incorrect data can be added or corrected and resubmitted in instances where additions and corrections are authorized. In one embodiment of the present invention, the fuel uplift service system has error codes associated with each category of fuel uplift data recited in Table I above. The fuel uplift service system can also include back-up DMS servers (not shown) that can be accessed by users during times of service interruption involving DMS servers 118, 126(*a*)-126(*n*) such that occurrences of service interruption are minimized.

Once the fuel uplift data is submitted to the fuel uplift DMS servers and stored in one or more of the secured databases, a delivery ticket can be generated by one of the DMS servers 118, 126(*a*)-126(*n*) automatically or by request by an authorized user. In one or more embodiments of the fuel uplift service, the one or more DMS servers include a relational structure that creates a database object and table structures to store one or more types of information or a collection of data for a specific topic, including but not limited to one or more categories of the fuel uplift data described herein with reference to Table I above. Relationships are defined between certain types of these data structures such that, depending upon the type of form, report or query that is requested from an authorized user, certain relevant information is retrieved from one or more databases residing within DMS server(s) 118, 126(*a*)-126(*n*). Unique identification codes associated with each record in each data structure allows the DMS servers to distinguish one record from another. Other relational database schemes can be utilized within the present invention that allow for relationships between data records to be defined using unique ID fields and similar relationship schemes. In one embodiment of the present invention, forms that include controls that contain instructions and associations with fields in relevant data records in the database structures in one or more of the DMS servers 118, 126(*a*)-126(*n*) are defined such that various reports and other documents can be generated by the fuel uplift service system. For example, after the relevant fuel uplift data is successfully submitted to the fuel uplift service system, the generation of a delivery ticket can be requested by an authorized user. Upon the request, the software application instructions included in the reporting manager access the underlying fields in the data structures to retrieve the relevant data stored therein and populate a data field in a pre-designed and stored form identified as a delivery ticket form.

In one or more embodiments, once a delivery ticket is generated, a copy of the delivery ticket is transmitted to a fuel supplier for approval. In addition to the fuel uplift service data entered by a user, the delivery ticket can also include tax information, generated for example by the scheduling and tax provision module, and any other relevant and identifying information (e.g., an email address) that is required to generate an invoice and other management and reporting documents an authorized user of the fuel uplift service requests. For example, a client signature can be included or associated with the delivery ticket via a touch-screen, an electronic signature, or via other mechanisms. Copies of the delivery ticket are stored on the fuel uplift service data servers 118, 126(*a*)-126(*n*) for retrieval upon command by authorized users. The fuel delivery ticket and/or other reports and documents can also be sent to one or more suppliers, resellers, or aircraft operators upon request by an authorized user or automatically depending upon preferences that can be set by the authorized user of the fuel uplift service. Depending upon set preferences or the type of request transmitted to the fuel uplift service, a summary of the delivery ticket information is provided to a fuel uplift service client in a comma-separated values (CSV) formatted file in a predetermined manner (e.g., at predetermined intervals, upon the occurrence of pre-determined events). These CSV files can be exported from and imported to programs that utilize table and other similar data structures to store data such as, for example, proprietary and other spreadsheet programs identified herein, including OpenOffice Calc. and Microsoft Excel. The summaries can include information that is used by a fuel uplift service client to, in turn, generate additional invoices that can be submitted to a client's third-party client without having to manually enter the data into the client's invoicing system. In this example, the third-party invoices are generated in a similar fashion as the original invoices (e.g., utilizing the reporting manager and pre-fashioned reporting templates and/or user preferences).

Another example of the type of report that can be generated by an embodiment of the present invention utilizing the reporting manager is an invoicing report. As described with reference to FIG. 2, the database server(s) 118,128 can format the fuel uplift information to generate a fuel uplift invoicing report at step 212. In one or more embodiments, various client entities 140 and/or 160, that can include a supplier and a reseller, can also have different requirements, formats and procedures that impact what information is required to be included within an invoicing report. These requirements can affect how the fuel uplift information is to be displayed and emphasized in an invoicing report, and what information is to be withheld from inclusion therein depending upon the person(s) that has access to the invoicing report, the person(s) that requested that an invoicing report be generated, the recipient(s) of the invoicing report, and the purpose for generating the invoicing report (e.g., accounting and invoicing purposes). The one or more processors included in the database server(s) 118,128 can format the fuel uplift information utilizing the reporting manager to generate an invoicing report that is specific to each client company 140,160 and each of these client company needs. Once the invoicing report has been generated, the invoicing report can either be sent to the client entities 140,160 automatically or upon requests via network 116. Client entities 140,160 can also access the fuel uplift service database servers 118,128 via network 116 to obtain an invoicing report. Alternatively, client entities 140,160 can utilize a website that allows for the requests and/or display of an invoicing report generated by the database server(s) 118,128. For example, a company specific invoicing report can be sent to a specific client company such as a source supplier at step 224, or a reseller supplier at step 226.

The database server(s) 118,128 can also transmit location and client sales summary data at step 206. The location and client sales data can be based at least in part on the information input into the fuel uplift service user interface and/or generated by the fuel uplift service, and other information stored in the database server(s). For example, at step 208, fuel uplift service clients can interact with the database server(s) 118,128 to input different types of data into a GUI such that certain reports and measures can be generated and determined by the one or more processors included in the database server(s) 118,128. A reporting manager included in the software application executed by the one or more processors included in the database server(s) of the DMS system(s) 118,128 can generate a report based at least in part on the stored data, historical data, and/or requirements data. The data can include, for example, sales data, inventory data, date and time data, location data, needs and requirements data, airplane and airport data, and scheduling and logistics data. For example, the fuel uplift service has the capability to summarize a seller's or reseller's fuel supply, the sales enjoyed by a seller in relation to the seller's fuel supplies, show these sales in graphical or textual form over a period of requested time, provide inventory levels of fuel supplies historically or provide estimated inventory levels for a requested range of future temporal periods. The fuel uplift service can utilize historical fuel uplift data and generate extrapolated fuel uplift data to provide a forecast of a fuel supplier's inventory levels of fuel products for a specified time in the future. The fuel uplift service can provide the aforementioned summaries or other reports for a specific client, an aggregation of clients, by region or location, over a known time period, or for one or more of a seller's clients for each of the aforementioned categories. Some examples of the types of reports and analysis that can be generated by the fuel uplift service include a risk management report, an inventory report and a client usage report. These and other fuel usage and inventory reports and documents can be transmitted via network 116 to clients of the client company and/or clients of the fuel uplift service, depending upon which of these entities and which personnel included in these entities have proper authorization to view, input, display, output and/or transmit this information. For example, the generated fuel usage and inventory reports and documents can be transmitted to a reseller supplier at step 230 if the proper authentication(s) and authorization(s) have been verified and allowed by the fuel uplift service. Similarly, the generated fuel usage and inventory reports and documents can be transmitted to a source supplier at step 222 if the proper authentication(s) and authorization(s) have been verified and allowed by the fuel uplift service.

In one or more embodiments of the fuel uplift service including those embodiments wherein users of the fuel uplift service can submit fuel uplift data and access fuel uplift data stored in the database server(s) 118,128 directly over a network or via a website, the fuel uplift service is configured to allow for transmission of private, confidential and/or proprietary data between user devices 102 and the database server(s) 118,128. In these embodiments, a verification module is utilized to verify a user's credentials. For example, a user's credentials can consist of user assigned log-in credentials that include a user name and a password that can be entered into data fields on a GUI or website display. Additionally, a user's log-in credentials can also consist of an access key that can be input into the user device via an input device, such as a keyboard. In one embodiment, the user name, password and an access key are utilized to sign into the fuel uplift service and upload information to and download information from the database server(s) 118, 128. For example, using a website provided by the fuel uplift service, users can preview and select options to view information stored on the database servers, upload information to the database servers or download information to the database servers once certain user credentials are authenticated. In one embodiment, log-in credentials are specific for each fuel uplift service client. For example, if a fuel uplift service client has multiple accounts, or if the client wishes to restrict access to certain information within one or more accounts to specific users, an access key can be assigned to one or more accounts, and the same or different access keys can be assigned to specific information associated with one or more of the accounts. Alternatively, a user name, password and access key configuration can be utilized to view information stored on the database servers, upload information to the database servers, forward information to other authorized recipients, or download information to the database servers by accessing the database server(s) 118,128 via a network 116 with the use of a software application, module or network address, without the use of a website.

In one or more embodiments, access keys utilized by the fuel uplift service and service can consist of a single access key ID, an access key and a secret access key, or some other key suitable for the intended purpose. In another embodiment of fuel uplift service, the authentication module can create and use temporary access keys, known as temporary security credentials. In this embodiment, temporary security credentials can include a security token that a user must send to the fuel uplift database server(s) to view information stored on the database server(s) 118,128, to forward the information to authorized recipients, to upload information to the database server(s) 118,128 or to download information to the database server(s) 118,128. For example, temporary security credentials can be short-term such that, after they expire, the security credentials are no longer valid. Temporary security credentials can be sent to authorized users via email, text message, automated voicemail, automated phone call, or requested by an authorized user using these same communication vehicles. Temporary access keys can also be utilized in less secure environments or distributed to grant users temporary access to resources in the fuel uplift service. For example, users that are associated with one or more accounts or account holders that utilize the fuel uplift service can be granted temporary access to other fuel uplift service accounts, or users who don't have fuel uplift service security credentials can be granted temporary access to fuel uplift service accounts.

In one or more embodiments, the authentication module can utilize key pairs that include a public key and a private key. In these embodiments, the fuel uplift service can use the private key to create a digital signature, and then the fuel uplift service can use the corresponding public key to validate the signature.

In one or more embodiments, one or more administrators or other authorized personnel of an airport facility can secure user credentials for others to access and utilize the fuel uplift service. For example, a username and password that has administrative rights associated to with the username and password can be given to an administrator that allows the administrator to grant access to the fuel uplift service system to formerly unauthorized entities. The administrative rights given to an administrator can be, for example, the same for a given customer, type of fuel, type of aircraft, for all relevant administrators employed in a certain region or airports in a certain region. Additionally, the administrative rights given to a particular administrator can be different depending upon the requirements of the fuel supplier, the airport, the governmental authority over the airport or the region. For example, each administrator can be given administrator rights for a specific airport where that administrator is registered as an administrator.

In one or more embodiments, the first time an administrator logs into the system by entering a valid username and valid password, the administrator is prompted to change their password. Should the administrator forget the password, the fuel uplift service can issue a new password upon notification that the administrator forgot their password and the completion of a validation procedure wherein the system verifies that the administrator is an authorized user of the system and has administrator rights. This validation procedure can include the emailing, texting, or calling of an administrator to communicate a new password to the same via a previously stored email address, cellphone number, or telephone number. Once the administrator receives the new password, the administrator can enter the new password in association with her current username to set the new password. Other identification and verification procedures known to those of skill in the art can be utilized by the fuel uplift service (e.g., retinal scanning recognition, finger print recognition, personal or previously stored electronic question and answer session(s), or any combination of the aforementioned).

In one or more embodiments, a user can access the fuel uplift service via a website by entering a URL into a World Wide Web browser (e.g., Internet Explorer, Firefox, Google Chrome, etc.) or via a software application residing upon a user device 102. In these embodiments, an authentication and validation process can be implemented to protect against unauthorized access to the fuel uplift service. Once an administrator is authorized to act as an administrator in the fuel uplift service system, the administrator can manage access for additional users of the service. For example, airport ramp personnel can be issued a username and a temporary or permanent password by the fuel uplift service system. If the password is not a permanent password, the system can communicate a list of instructions to change the new user's temporary password to a permanent password. Alternatively, if a user forgets her username and/or password, an authorized administrator can have the system issue another username and/or password to the user.

FIG. 3 illustrates a process flow chart of one or more embodiments of the fuel uplift service system. The method and system described with reference to FIG. 3 includes a logistical process 300 that can be implemented utilizing the fuel uplift service that can utilize the network environment illustrated in and described in association with FIG. 1. The process flow chart can be implemented by and represents a collection of modules configured as software code that is executed by one or more processors and/or microprocessors. These modules can run on the DMS 118 or distributed across DMS systems 118, and/or 126(a)-126(n) residing at one or more facilities that host the fuel uplift service. Alternatively, these modules can reside on user devices 102. A software application can facilitate the exchange of information described in the process flow chart of FIG. 3 and can be resident upon and be executed by user devices 102(a)/102(b) described herein. The software application allows the user devices to interact and communicate with one or more server(s) 118,128(a)-128(n) to utilize and execute the software application that enables a user to utilize the fuel uplift service. The user devices 102 can, in one embodiment of the present invention, communicatively connect to the fuel uplift service database server(s) 118,128(a)-128(n) via network 116 using a website having a URL that is accessible via the Internet. In another embodiment, user devices 102 can communicatively connect to the fuel uplift service database server(s) 118,128(a)-128(n) via network 116 utilizing a network address and/or a software application that connects to the database servers over a network.

At step 302, fuel uplift service clients 140,160 access a fuel uplift service website hosted on the network 116 (i.e., the Internet). The fuel uplift service clients 140,160 can be various entities, as described herein, but are described with reference to FIG. 3 as an aircraft operator, a reseller supplier and a client user in the form of a computer described as a third-party price management tool. At step 304, the fuel uplift service website receives fuel data requirements submitted by the fuel uplift service clients 140,160. The fuel data requirements can include one or more of the fuel data requirements described herein with reference to Table I, provided above. In this example, the fuel uplift service clients 140,160 submit via network 116 fuel data requirements information that includes the date that the fuel service will be provided, the volume of the fuel, the aircraft registration number, the credit card number, and the name and/or other identification information of the supplier and/or the reseller of the aircraft fuel.

At step 306, the fuel uplift data submitted to the fuel uplift service website at step 304 is submitted to the supplier 302 for credit approval in the form of a credit approval request 308 that is transmitted to the fuel source supplier. Similar to step 306, the fuel uplift data is submitted to the reseller for credit approval at step 310 in the form of a credit approval request 309. The credit approval request 308 can be the same or different than the credit approval request of 309 depending upon the credit approval requirements of the reseller and the supplier.

At step 312, one or more users using user devices 102 downloads via the network 116 data that includes at least a portion of the data submitted to the fuel uplift service website at step 304. The users can be registered users that have been verified and authenticated using the same procedures discussed herein with reference to FIG. 2. The transmitted and downloaded data is used to populate a fuel uplift service interface that allows the user to input additional fuel uplift information if required. In the example of FIG. 3, the fuel uplift data that is downloaded to the user device 102 at step 312 is data that is specific to that location of the user and/or the location of the aircraft and the supplier utilized to obtain the fuel. Once the required data fields in the fuel uplift service interface that resides on a user device 102 have been completed, the required data fields are transmitted via network 116 to the fuel uplift service database server(s) 118, 128(a)-128(n) at step 314 to be organized and stored, and reformatted where applicable. At step 314, the fuel uplift service database server(s) 118,128(a)-128(n) can manipulate the downloaded fuel uplift data in various ways including converting the volume of fuel from one unit of measurement into another unit of measure (e.g., USG to liters, etc.) depending upon the needs of the user or a recipient of the information. Additionally, other fuel uplift data can be determined, collected, stored and organized, such as gathering information relative to the temperature and the specific gravity of the fuel to be input into a report generated by the fuel uplift service database server(s) 118,128(a)-128(n) for a governmental or other governing entity or authority.

At step 316, the fuel uplift service organizes the fuel uplift data and generates one or more reports used by the fuel uplift service clients 140,160 to assist in carrying out business activities such as invoicing a fuel seller's customers. The one or more reports to be generated at step 316 can either be requested by the fuel uplift service clients, or the one or more reports can be automatically generated based upon fuel uplift service client preferences that can be stored in one or more client profiles saved within the fuel uplift service on the fuel uplift service database server(s) 118,128(a)-128(n). At step 320, the fuel uplift service uses the fuel uplift data to calculate fuel usage for a location of interest, for an aircraft, over a temporal period, or for a specific client either at the request of a fuel uplift service client 140,160. Alternatively, the fuel usage data can be calculated automatically pursuant to preferences of the requesting fuel uplift service client(s) that are stored in the fuel uplift service database server(s) 118,128(a)-128(n). At step 328, the fuel usage data is transmitted via network 116 to either a fuel uplift service client 140,160 (e.g., source supplier, reseller supplier) and/or the client's customer(s) to monitor inventory levels of fuel supplies, and levels of usage of fuel products at specific locations, by a specific aircraft or aircraft company, over a specific region, and/or over a specific temporal period.

At step 322, the invoicing report(s) is sent to fuel uplift service clients 140,160 such as a computer operated by a third-party located at a fuel service uplift client facility, a reseller supplier, and/or a source supplier. Similar to step 316, the fuel uplift service organizes the fuel uplift data and generates one or more reports or documents including, for example, a customized fuel delivery ticket to be used by a fuel uplift service client 140,160. The customized fuel delivery ticket can either be requested by the fuel uplift service client, or the one or more reports including, for example, a delivery ticket can be automatically generated based upon fuel uplift service client preferences. The client preferences can be stored in one or more client profiles stored within the fuel uplift service system on the fuel uplift service database server(s) 118,128(a)-128(n). At step 324, the one or more reports (e.g., a fuel delivery ticket) are sent to fuel uplift service clients 140,160 such as a third-party computer located at a fuel service uplift client facility, a reseller supplier, a source supplier and/or an aircraft operator.

The fuel uplift service stores customized fuel delivery tickets for fuel uplift service users 140,160 in the fuel uplift service database server(s) 118,128(a)-128(n) at step 326. The delivery tickets are available for viewing, printing, forwarding, downloading, and cancelling the delivery of fuel products by authorized, approved and/or authenticated users. The verification and authentication procedures discussed herein can be implemented in one or more embodiments described herein, including with the fuel uplift service and the logistical processes described with reference to FIGS. 2, 3 and 4. For example, one or more of the verification and authentication procedures described herein can be utilized in the fuel uplift service and logistical process 300 described with reference to FIG. 3 to authorize, verify and/or authenticate a user to utilize the fuel uplift service to perform the functions described herein. A fuel delivery ticket can be accessed via the fuel uplift delivery website, or accessed by communicatively coupling to the fuel uplift service database server(s) 118,128(a)-128(n) using authentication and verification procedures for approved participants over a network.

Figure 4:
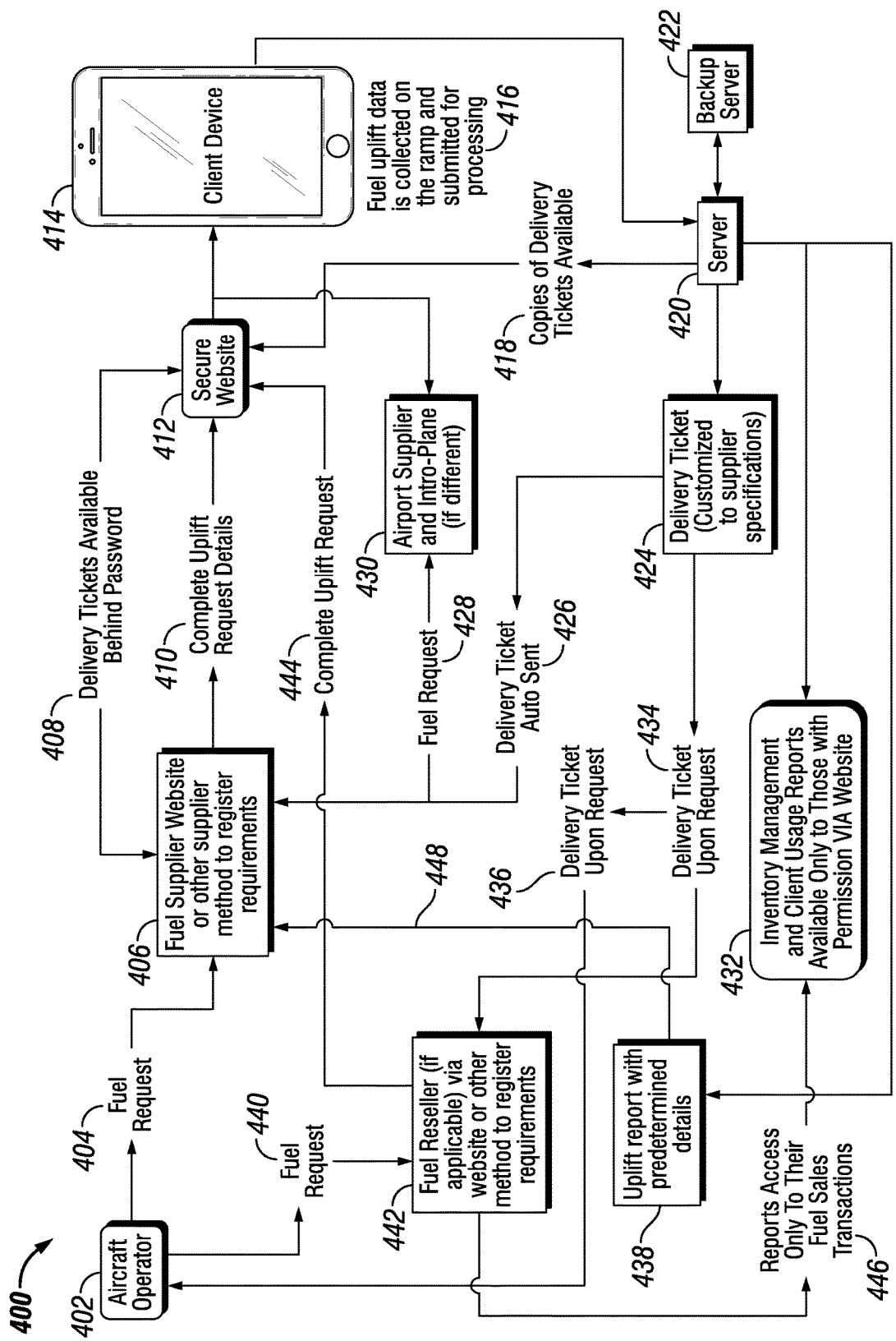
FIG. 4 provides another example of a fuel uplift service system and the functions performed and the steps taken by various implementations and embodiments of the present invention described herein to perform those functions.

FIG. 4 illustrates a process flow chart of one or more embodiments of the fuel uplift service system and an example of another implementation of the fuel uplift service and logistical process 400 that can be implemented within the fuel uplift service and utilize the network environment described herein with reference to FIG. 1. The described process flow chart 400 can be implemented utilizing one or more modules configured as software code that is executed by one or more processors or microprocessors. The one or more modules can run on the DMS 118 or can be distributed across DMS systems 118, and/or 128(a)-128(n) residing at one or more facilities that host the fuel uplift service. Alternatively, the one or more modules can reside on a user device 102. A software application can facilitate the exchange of information between a user device 102 and the fuel uplift service described in the process flow chart of FIG. 4. The software application can be resident upon and be executed by a user device 102(a)/102(b) described herein to enable a user to interact with the fuel uplift service. The fuel uplift service application allows a user device to interact and communicate with one or more server(s) 118,128(a)-128(n) to submit fuel uplift data to the one or more servers utilizing a GUI and retrieve fuel uplift information. The fuel uplift service, as described with reference to FIG. 4, enables a user device 102 to communicatively connect to the fuel uplift service database server(s) 118,128(a)-128(n) over network 116 (e.g., Internet) using a website having a URL that is accessible via the Internet. In another embodiment, a user device 102 can communicatively connect to the fuel uplift service database server(s) 118,128(a)-128(n) via network 116 utilizing a network address and/or a software application that connects to the database servers over a network (e.g., a WAN, LAN, cellular network, wireless network, satellite linked network, etc.).

At step 402, an aircraft operator or other fuel uplift service client uses a computing device, such as computing device 152(a)-152(n),154(a)-154(n)/172(a)-172(n),174(a)-174(n) residing at a client facility 140,160 or a computing device communicatively attached to a network, to send a fuel requests 404 to a third-party fuel supplier. At step 406, the fuel request is either communicated to a fuel supplier via a website or using some other method that allows the fuel uplift service client to transmit the request and register service requirements with the fuel supplier. At step 410, the third-party fuel supplier transmits a fuel uplift service request to the fuel uplift service via a website at step 412 or over a network. The request can be input in or converted to any one of the following formats, including CSV, HTML, XML, JSON, SQL, KML, Delimited, another known electronic format, or a combination of the aforementioned formats and formatted files. The fuel uplift service request can be transmitted to the fuel uplift service database server(s) 118,128(a)-128(n) via network 116 utilizing a network address and/or a software application that connects the computing device 140,160 to the fuel uplift service. Alternatively, the third-party fuel supplier can submit the uplift request to a fuel uplift service website. The fuel uplift service website is secured as described herein and allows authorized users to interact with the fuel uplift service system once a user is validated and authenticated according to the procedures described herein. In one or more embodiments, the fuel supplier can add additional information to the fuel uplift service request to complete the request. In other embodiments, once the fuel uplift request is received by one or more database servers 118,128(a)-128(n), the fuel uplift service can utilize previously stored information and other data to complete the fuel uplift request.

The fuel uplift service system also accommodates fuel resellers if they are needed to complete aircraft fuel uplift operations. If a fuel reseller is the provider of the aircraft fuel that is the subject of the relevant fuel uplift operations, a fuel request is transmitted from an aircraft operator to a fuel reseller at step 440. In this example, the fuel reseller completes the fuel transmitted fuel request at step 442 and transmits a complete fuel uplift request to the fuel uplift service database server(s) 118,128(a)-128(n) via a third-party aircraft fuel reseller network at step 444. In this example, an authorized user can use a user device to access the fuel uplift service database server(s) 118,128(a)-128(n) to obtain the fuel uplift request via a network 116 or via a website residing on a network 116.

At step 446, the reseller can transmit one or more fuel sales reports and other associated information to the fuel uplift service database server(s) 118,128(a)-128(n). In one or more embodiments, the information contained in the transmitted documents, including the fuel sales report, will be processed by one or more modules including an inventory monitoring module. The inventory monitoring module will utilize the organize the transmitted data and process the information. The inventory monitoring module can generate other information based upon the transmitted information where required. Information concerning the fuel reseller including the information included in the fuel sales report is stored in one or more of the fuel uplift service secure databases as described with reference to FIG. 1 herein. At step 432, information previously stored in the fuel uplift service database(s) or generated by the fuel uplift service can be accessed and utilized by a reporting manager module to generate fuel uplift service inventory management and client usage reports. The reports are available to an authorized user of the fuel uplift service via a website or over a network as described herein.

At step 412, the fuel uplift service database server(s) 118,128(a)-128(n), via network 116 or via a secure website, transmits fuel data requirements to an authorized fuel uplift service user. For example, the authorized user can be an airport employee, aircraft employee or other employee authorized to engage in fuel uplift activities and is authorized to access the fuel uplift service system. At step 414, a fuel uplift service user using a user device 102(a),102(b) receives fuel data requirements from one or more of the fuel uplift service database server(s) 118,128(a)-128(n) on a user device 102(a),(b). Alternatively, the fuel uplift service user can also access the fuel uplift service via a website or a network to receive the fuel data requirements. The fuel data requirements can include one or more of the fuel data requirements described in Table I, provided above. In this example, the fuel uplift service submits, via network 116, fuel data requirements information. At step 430, fuel data requirements information is also transmitted to an airplane fuel supplier and/or into-plane airport agent (if the into-plane agent is a separate entity than the airplane fuel supplier entity).

At step 414, authorized fuel uplift service personnel collect fuel uplift data using one or more user devices 102(*a*),102(*b*) and submit the same to fuel uplift service database server(s) 118,128(*a*)-128(*n*) for processing using one or more methods described herein (e.g., over a network, via a website, direct access). At step 420, the fuel uplift service can use one or more software modules or a software application executed by one or more processors included in DMS system 118 and/or distributed across DMS systems 118, 128(*a*)-128(*n*) to collect, organize, process and manipulate the transmitted fuel uplift data as described herein. The fuel uplift data associated with one or more fuel uplift users can also be stored on backup DMS systems at step 422. At step 424, a reporting manager that resides in one of the fuel uplift service database servers manipulates the fuel uplift data stored in the fuel uplift databases included in DMS systems 118, 128(*a*)-128(*n*) and generates a fuel delivery ticket based upon the fuel uplift data. The reporting manager can also generate other relevant documents such as invoicing reports, accounting reports and documents, client usage reports including fuel usage reports, and other uplift documents and reports. The fuel delivery ticket, fuel uplift data and any other reports or documents generated by a reporting manager for one or more users are transmitted to a backup server at step 422.

The delivery ticket, described herein, can either be a standardized delivery ticket, or a fuel delivery ticket that is customized pursuant to preferences associated with a particular fuel supplier or customer of a fuel supplier. Once a fuel delivery ticket has been generated, the delivery ticket is accessible to authorized users of the fuel uplift service system. For example, fuel delivery tickets are available upon request to fuel resellers (if applicable) at step 434 and to aircraft operators at step 436. For example, users can access the fuel uplift service system and obtain fuel delivery tickets via a network or via a website at step 418. At step 426, the fuel delivery ticket(s) are also transmitted to the relevant third-party fuel supplier. At step 442, a third-party fuel supplier or a reseller can make the fuel delivery ticket(s) available to its customers via a third-party fuel supplier website or via other methods of accessing its system(s). In one or more embodiments, at step 426, the fuel uplift service can be programmed to transmit a fuel delivery ticket automatically at a specific time, upon completion, or upon some other predetermined condition. For example, an aircraft operator can access a third-party website, such as a fuel supplier website, to obtain a fuel delivery ticket that was generated by and automatically transmitted to the fuel-supplier over a network. At step 428, a fuel request is transmitted to the relevant airport fuel supplier and into-plane agent (if the into-plane agent is a different entity than the airport fuel supplier).

The reporting manager that resides in one or more of the fuel uplift service database servers 118,128(*a*)-128(*n*) can also generate an inventory management report and a client usage report, described herein, that are based at least in part on the collected fuel uplift data, at step 432. The inventory management and client usage reports are stored in one or more of the secure databases included in the DMS systems 118, 128(*a*)-128(*n*) and are available to authorized users of the fuel uplift service system. For example, once generated, authorized users can access the fuel uplift service system and obtain inventory management and client usage reports via a network or via a website at step 432. Fuel uplift reports based at least in part on the collected fuel uplift data are also generated by the fuel uplift service database server(s) 118, 128(*a*)-128(*n*) at step 438. The uplift report(s) can be formatted in an HTML, CSV, PDF, Excel, Word file, or XML format, or formatted in other known formats in the art and described herein. The reports can be organized in a standardized format or organized in a customized format and include additional information that is specific to fuel uplift client preferences and/or requirements. The fuel uplift report(s) can also be made available to one or more third-party fuel suppliers via a third-party fuel supplier website or via other methods of accessing a third party's system(s) at steps 448 and 406.

Figure 5:
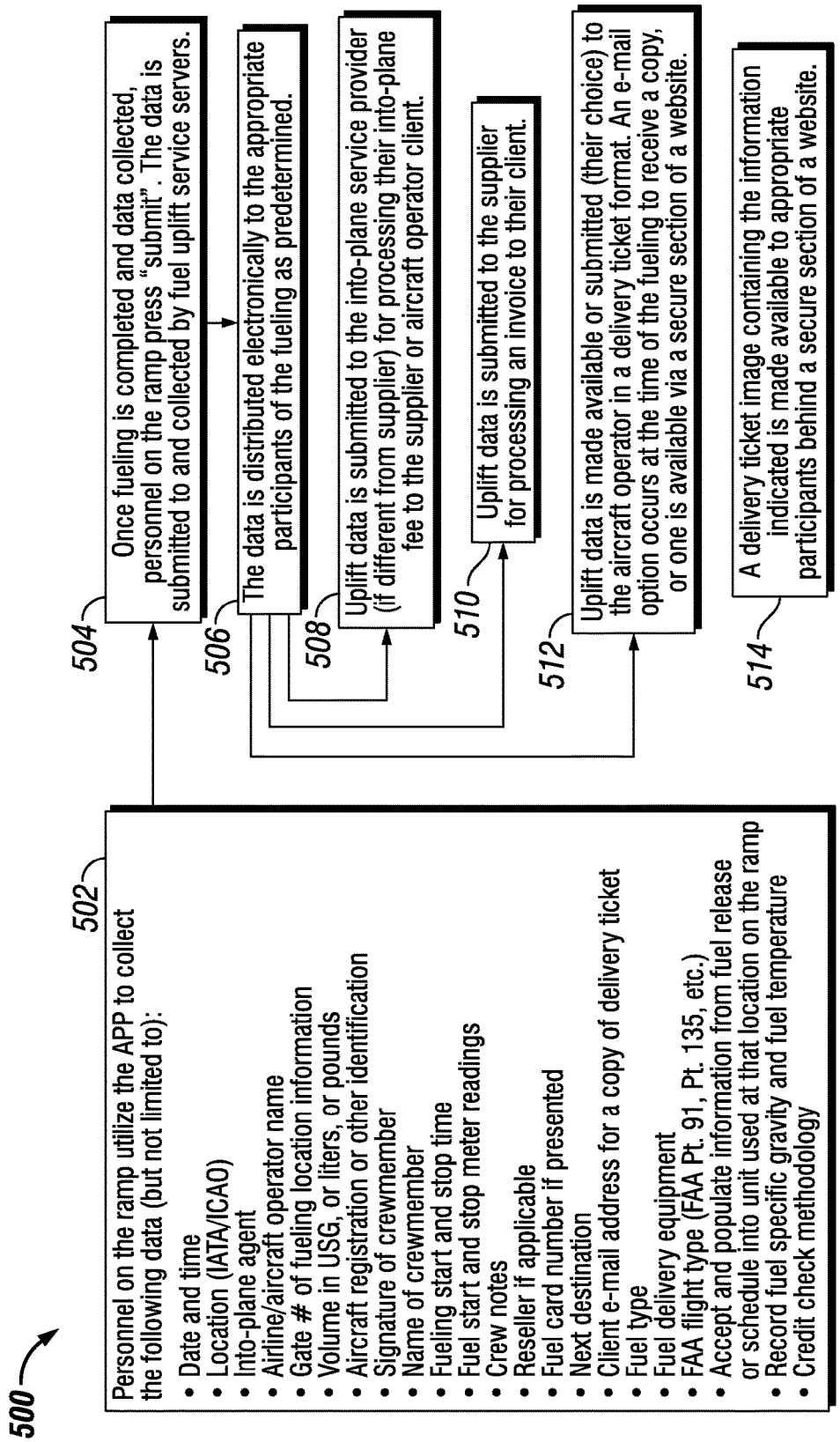
FIG. 5 provides an example of the types of input data that can be used by the system and method of the present invention and an example of the steps taken by various implementations and embodiments of the present invention described herein to manipulate input data.

One or more embodiments of the fuel uplift service described herein include one or more software programs in the form of one or more modules, a software application, a website and/or one or more computer programs running on the fuel uplift database server(s) 118,128(*a*)-128(*n*). The steps performed by the fuel uplift service software program are described herein with respect to FIGS. 2, 3, 4 and 5 that include one or more process flow diagrams that illustrate one or more methods performed by one or more embodiments of the present invention. For example, FIG. 5 illustrates a series of steps described in a flow chart 500 that are performed by the fuel uplift service described herein with respect to the various embodiments and, specifically, the software utilized therein. One having ordinary skill in the art will appreciate that the steps described in the flowchart 500 of FIG. 5 are meant to be example steps that can be performed by the fuel uplift service. For example, one or more of the method and process steps, although illustrated in a top-down fashion, can be performed in a different order than how they appear in FIGS. 2-5. Additionally, one having skill in the art will appreciate that the various embodiments of the present invention can include additional servers and computing devices not described herein that can assist in implementing the steps and processes described in FIGS. 2-5. For example, there can be one or more intermediary servers between the user devices 102 and the fuel uplift database server(s) 118,128(*a*)-128(*n*) that reside at a user's location, on the network 116, or at a fuel uplift service site 117. In one or more embodiments, one or more additional intermediate servers can also be utilized to function as DMS systems that include one or more processors configured to execute the fuel uplift service software programs to perform one or more functions described herein.

With reference to FIG. 5 and step 502, a user of the fuel uplift service can utilize a user device 102(*a*),(*b*) to collect fuel uplift data such as, for example, one or more fuel uplift data items described in Table I, FIGS. 6A through 6F and illustrated at step 502 of flow chart 500. For example, one or more embodiments of the user device includes a fuel uplift software interface that includes a GUI that includes one or more data fields that are configured to accept input and generated fuel uplift data, and display at least a portion of the fuel uplift data. The GUI is configured to facilitate the collection and display of at least a portion of the collected information and data concerning a fuel uplift operation. For example, the fuel uplift service can automatically collect the fuel uplift data from previously stored data that resides either on a user device, or one or more database servers accessible by the user device. In one or more embodiments, the fuel uplift service can provide an interface to a user of the service that is configured to accept input data such that at least a portion of the fuel uplift data input therein can be stored locally or remotely in one or more accessible databases. In one or more embodiments, the fuel uplift service software interface can generate other fuel uplift data based upon previously collected and/or input fuel uplift data. In one or more embodiments, the fuel uplift service software interface can either be accessible locally on a user device 102(*a*),(*b*) using a software application. In one or more embodiments, the fuel uplift service software interface can be accessible via a website that is accessible via one or more networks utilized to connect the user device to the Internet. In one or more embodiments, the fuel uplift service software interface can be accessible via access to one or more fuel uplift service database servers 118, 128(*a*)-128(*n*), or via a combination of one or more of the aforementioned configurations.

In one or more embodiments, filters can be associated with certain data fields included in the GUI to assist a user to input certain fuel uplift information. The filters can be configured to, for example, set certain limits on certain number values, limit data input with respect to certain data fields, and assists a user in inputting correct and reliable data into the fuel uplift service interface. In instances where one or more filters are utilized to protect against incorrect or inconsistent data input, auditory or digital warnings can be utilized to warn a user against the input of incorrect or inconsistent data entries in another embodiment of the present invention.

Examples of the various GUI data fields and types of fuel uplift data items and information will be discussed with reference to step 502 of flow chart 500.

Date & Time. In one or more embodiments, data fields concerning the date and time of fuel uplift service activities can be limited to a certain number of characters for the month, day and year respective data field(s), and/or can be configured to populate the data field with date and time data automatically. The date and time data can reflect the current date and time or some other date and/or time selected by a user or associated with other fuel uplift data residing within the associated data field(s). In another embodiment, auditory or digital warnings can be utilized to warn a user against the input of incorrect or inconsistent date, time and associated data entries.

Location. In one or more embodiments, a user can input data into the data field(s) associated with the location of one or more fuel uplift activities utilizing, for example, text field(s), a drop-down menu or some other form of input. In one or more embodiments, depending upon the number of text characters and symbols required to properly identify a particular location (e.g., airport, specific area on the airport grounds, airport hangar or other facility location, city, state, country, etc.) or other criteria, a filter can restrict a user to the size and to certain types of entries depending upon the location of the craft, previously input location information, and/or FAA or the Foreign equivalent of FAA and other regulatory regulations. A user can be given limited selections depending upon the fuel uplift service client's market presence, and/or other restrictions such as the aircraft's relationships with other business partners. In another embodiment, auditory or digital warnings can be utilized to warn a user against the input of incorrect or inconsistent data entries.

Into-plane Agent. In one or more embodiments, a user can interact with the fuel uplift service interface using one or more radio buttons, drop-down menus, selection tables, or text fields to input a user identification (e.g., name, ID number or other identifier(s), etc.). In one or more embodiments, a user can also associate flight and/or aircraft information with the into-plane agent data. In one or more embodiments, one or more filters can be associated with the into-plane agent data field(s) such that incorrect or inconsistent into-plane agent information and/or aircraft information is identified. In another embodiment, auditory or digital warnings can be utilized to warn a user against the input of incorrect or inconsistent data entries.

Airline/Aircraft operator name. In one or more embodiments, a user can interact with the fuel uplift service interface using one or more radio buttons, drop-down menus, selection tables or text fields to input data concerning the airline with which the aircraft is associated, owned, or otherwise connected. In one or more embodiments, data concerning the aircraft operator name (e.g., business name, name of aircraft personnel, identification numbers or other identifying information) can be input into the fuel uplift service interface. In one or more embodiments, filters can be employed to narrow a user's selections as other information is input into the interface. In other embodiments, filters can be used to help protect against the incorrect or inconsistent entry of airline and aircraft operator name data by comparing known associations of airline data and aircraft operator names to ensure consistent or accurate entries. In another embodiment, auditory or digital warnings can be utilized to warn a user against the input of incorrect or inconsistent data entries.

Gate #/Fueling location information. In one or more embodiments, fueling location data can be input into the fuel uplift service interface using one or more radio buttons, drop-down menus, selection tables or text fields. In one or more embodiments, fueling location data can include gate information or other location information (e.g., airport, specific area on the airport grounds, airport hangar or other facility location, city, state, country, etc.). In another embodiment, filters can be utilized that compare the fuel location information with other previously input data, such as airline data that includes information concerning the airplane (e.g., association, ownership, flight plan, location, etc.) to protect against incorrect or inconsistent data entries. In another embodiment, filters can be employed to narrow a user's selections as other information is input into the interface using one or more radio buttons, drop-down menus, or selection tables or text fields. In another embodiment, auditory or digital warnings can be utilized to warn a user against the input of incorrect or inconsistent data entries.

Volume in USG (U.S. Gallons), liters, pounds, etc. In one or more embodiments, fuel measurement data can be input into the fuel uplift service interface using any preferred unit of measurement including gallons, liters, pounds, kilograms, etc. In another embodiment, filters can be utilized to convert one unit of measurement to one or more other units of measurements that are used to describe the volume of fuel used in a fuel uplift service operation or activity. In another embodiment, auditory or digital warnings can be utilized to warn a user against the input of incorrect or inconsistent data entries.

Aircraft registration or other identification. In one or more embodiments, a user can interact with the fuel uplift service interface using one or more radio buttons, drop-down menus, selection tables or text fields to input data concerning aircraft identification information. Aircraft identification information can include, for example, aircraft registration data, an aircraft name, an aircraft owner(s), an aircraft operator(s), an aircraft location, an aircraft origin and/or destination, and/or other identifying aircraft information with which the aircraft is associated or otherwise connected. In another embodiment, filters can be employed to narrow a user's selections as other information is input into the interface. In other embodiments, filters can be used to help protect against the incorrect or inconsistent entry of airline identification information by, for example, comparing known associations of airline data and aircraft operator names to ensure consistent or accurate entries. In another embodiment, auditory or digital warnings can be utilized to warn a user against the input of incorrect or inconsistent data entries.

Signature of crewmember, Name of crewmember. In one or more embodiments, crewmember signature or name information can be input into the uplift service interface. Crewmember signature and name information can be input into the interface using one or more radio buttons, drop-down menus, text fields, digital signature field, digital entry device or a stylus pen interacting with a touch screen or other similar digital interactive input devices such as a mouse or digital pen. In this way, if the user inputs handwritten data, the handwritten data, along with other user data input information. can be stored as ASCII text in the DMS system. In another embodiment, filters can be employed to narrow a user's selections of crewmember names and signatures as other information is input into the interface. In other embodiments, filters can be used to help protect against the incorrect or inconsistent entry of crewmember signature and name information by, for example, comparing known associations of airline data and aircraft operator names, crewmember names, etc. to ensure consistent or accurate entries. In another embodiment, auditory or digital warnings can be utilized to warn a user against the input of incorrect or inconsistent data entries.

Fueling start & stop time, Fuel start & stop meter readings. In one or more embodiments, the fuel uplift service interface can be utilized to submit data to the uplift service concerning fuel start and stop time(s), and meter readings associated with a time a fuel uplift operation(s) was started and a time a fuel uplift operation(s) was stopped. The time can be input in a 12-hour (AM/PM) format or a 24-hour format (00:00:00-24:00:00). In another embodiment, filters can be employed to convert twelve-hour format time data into 24-hour time formation information. Filters can also be utilized to convert the units of measurement associated with the meter readings to other units of measurement as required. In another embodiment, auditory or digital warnings can be utilized to warn a user against the input of incorrect or inconsistent data entries.

Crew notes. In one or more embodiments, a crew member or other authorized aircraft, airline or fuel uplift service user can utilize the fuel uplift service interface to submit data to the uplift service concerning notes and notations. In one or more embodiments, a notes field can be utilized to enter a set number of text characters and symbols, images, notations, and/or a combination of the aforementioned data. In another embodiment of the present invention, character recognition can be utilized so that the crew notes can be parsed, distributed, searched and/or imported into other reports and documents.

Reseller. In one or more embodiments, data concerning a reseller of fuel products can be input into the fuel uplift service interface using one or more radio buttons, drop-down menus, selection tables or text fields. In one or more embodiments, reseller information can include data associated with a fuel provider company, fuel purchased from another supplier, contract fuel provider information, operator account information including with information concerning additional resellers and contract fuel programs, and information concerning fuel pricing for an identified region, temporal period and/or airport. In another embodiment, filters can be utilized to protect against incorrect or inconsistent input data. In one example, a filter can compare the fuel reseller input data with previously input or referenced information, such as aircraft information, airport information, regional and or fuel information to limit the choices a user can input into the interface. In another embodiment, auditory or digital warnings can be utilized to warn a user against the input of incorrect or inconsistent data entries.

Fuel card number. In one or more embodiments, a user can utilize the fuel uplift service interface using one or more radio buttons, drop-down menus, selection tables or text fields to input data concerning a fuel card number. In another embodiment, filters can be utilized to protect against incorrect or inconsistent input data. In another embodiment, auditory or digital warnings can be utilized to warn a user against the input of incorrect or inconsistent data entries. For example, the fuel uplift service can compare seller, reseller, customer, aircraft and/or aircraft owner information with the fuel card information and/or other identification information to limit the choices a user can input into the interface.

Next destination. In one or more embodiments, a user can utilize the fuel uplift service interface using one or more radio buttons, drop-down menus, selection tables or text fields to input data concerning destination information associated with an aircraft. In one or more embodiments, depending upon the number of text characters and symbols required to properly identify a location (e.g., airport, specific area on the airport grounds, airport hangar or other facility location, city, state, country, etc.) or other criteria. For example, a filter can restrict a user to certain selections of entries depending upon the original location of the craft, previously input location information, fuel information, aircraft information, fuel tank information including type and size, fuel usage and aircraft speed information, and/or FAA and other regulatory guidelines and regulations. In another embodiment, auditory or digital warnings can be utilized to warn a user against the input of incorrect or inconsistent data entries.

Client e-mail address information. In one or more embodiments, a user can utilize the fuel uplift service interface using one or more radio buttons, drop-down menus, selection tables or text fields to input data concerning an email address, URL, physical address, or other data that can be utilized to deliver, either digitally or physically, a fuel delivery ticket, invoice, or other report or document associated with fuel uplift operations and activities. In another embodiment, one or more filters can help prevent incorrect or inconsistent address information associated with the email address data field(s) from being input into the fuel uplift service interface. In another embodiment, auditory or digital warnings can be utilized to warn a user against the input of incorrect or inconsistent data entries.

Fuel type, Fuel delivery equipment. In one or more embodiments, the fuel uplift service interface can be utilized to input data associated with the type of fuel that can be used to fuel the aircraft and information concerning equipment that can be utilized to perform fuel uplift operations. In one or more embodiments, the interface can be utilized to input information concerning a fuel name, fuel delivery equipment identification (e.g., name, type, reference numbers, etc.) and the type of fuel that can be utilized to fuel an aircraft. In one or more embodiments, the fuel type and delivery equipment data can be input into the interface via a user using one or more radio buttons, drop-down menus, selection tables or text fields. In another embodiment, filters can be employed to narrow a user's selections of the type of fuel and the type of and required fuel delivery equipment that can be input into the interface based upon data previously input into the interface or previously stored data and preferences. In other embodiments, filters can be used to help protect against the incorrect or inconsistent entry of fuel type and delivery equipment data. For example, the fuel uplift service can compare airline and aircraft data, fuel type, fuel tank fittings, destination data, and associated fuel equipment to fuel type and fuel delivery equipment input data to ensure consistent or accurate entries. In another embodiment, auditory or digital warnings can be utilized to warn a user against the input of incorrect or inconsistent data entries.

FAA flight type (FAA Pt. 91, Pt. 135, etc.) or the Foreign equivalent thereof. In one or more embodiments, the fuel uplift service interface can be utilized to input data concerning a type of flight that an aircraft can undertake. In one or more embodiments, the FAA flight information or the foreign equivalent thereof that can be input into the interface can include regulations that apply to and regulate an aircraft, airport, flight operation and rules, including but not limited to FAA Part 91 regulations and FAA Part 135 regulations. In another embodiment, filters can be employed to narrow a user's selections of the type of FAA data that can be input into the interface based upon data previously input into the interface, based upon previously stored data and preferences, or as other information is input into the interface. In other embodiments, filters can be used to help protect against the incorrect or inconsistent entry of FAA flight data or the Foreign equivalent thereof. In another embodiment, auditory or digital warnings can be utilized to warn a user against the input of incorrect or inconsistent data entries.

Fuel release, Fuel schedule information. In one or more embodiments, the fuel uplift service interface can be utilized to input data concerning a release of aircraft fuel and fuel scheduling information. In one or more embodiments, the fuel release and fueling scheduling data can be input into the interface via a user using one or more radio buttons, drop-down menus, selection tables or text fields. In another embodiment, filters can be employed to narrow a user's selections of fuel release data and fuel scheduling data that can be input into the interface based upon data previously input into the interface, based upon previously stored data and preferences, or as other information is input into the interface. In other embodiments, filters can be used to help protect against the incorrect or inconsistent entry of fuel release data and fuel scheduling data. For example, the fuel uplift service can compare airline and aircraft data, fuel type, and associated fuel equipment data to the fuel release data and fuel scheduling data to ensure consistent or accurate entries. In another embodiment, auditory or digital warnings can be utilized to warn a user against the input of incorrect or inconsistent data entries. In another embodiment, the fuel uplift service interface can accept and populate the data fields concerning fuel release and fueling scheduling data from fuel release or schedule reports saved on the fuel uplift service into user devices at the specific fuel uplift service locations (e.g., on the aircraft ramp).

Fuel Specific Gravity, Fuel Temperature. In one or more embodiments, fuel specific gravity and fuel temperature data can be input into the fuel uplift service interface via a user. In another embodiment, the fuel uplift service can determine one or both of the fuel specific gravity and the fuel temperature based upon previously stored fuel uplift information and populate the interface with the information. In another embodiment, the fuel uplift service can download one or both of the fuel specific gravity and the fuel temperature from previously stored data. For example, a user can input the specific gravity of a fuel product from readings provided by fueling equipment including fuel recording equipment utilized at a site where the fuel uplift operation is taking place. Similarly, a user can input a temperature of the fuel based upon readings provided by fueling equipment including fuel recording equipment utilized at the site where the fuel uplift is taking place. Alternately, the specific gravity and/or the temperature of the fuel can be calculated using known formulas and methods and the results can be input into data fields present in the fuel uplift interface and/or transmitted directly to the fuel uplift database servers. In another embodiment, filters can be employed to narrow a user's input data concerning specific gravity and temperature information based upon data previously input into the interface, based upon previously stored data and preferences, or as other information is input into the interface. In other embodiments, filters can be used to help protect against the incorrect or inconsistent entry of specific gravity and temperature information. In another embodiment, auditory or digital warnings can be utilized to warn a user against the input of incorrect or inconsistent data entries.

Credit check methodology. In one or more embodiments, a user can input information into the fuel uplift interface concerning a credit authorization status of an aircraft owner, aircraft operator, aircraft customer, or any other entity (e.g., seller, reseller, etc.) that is associated with a fuel uplift operation, or a fuel product utilized for one or more fuel uplift transactions. In one or more embodiments, credit authorization data can be input into the interface via a user using one or more radio buttons, drop-down menus, selection tables or text fields. For example, the data fields can be associated with credit numbers, identifications, status indicators (i.e., verified, unverified, authorized, authorization pending, unauthorized, incomplete, etc.) and other information associated with credit transactions and credit authorization methodologies. In another embodiment, the fuel uplift service can include a credit check module and a credit authorization module that will determine if credit information is on file for a fuel uplift service client or customer and/or assist in performing a credit authorization procedure to ensure that the requirements for extending credit to a client or customer are met.

In another embodiment of the present invention, authentication and verification procedures can be implemented to allow data to be input into the interface and uploaded from the fuel uplift service. For example, the fuel uplift service can require a user to input a user name and password to access the fuel uplift service interface. To access information on the fuel uplift service database servers, another embodiment of the present invention utilizes an encryption key algorithm to allow a user of the uplift service to access stored data. One example of the uplift service utilizes a public key algorithm that uses a single encryption key password to function as the decryption and the encryption key. The single encryption key embodiment can use a symmetric encryption method. In another example, the public key can be changed periodically pursuant to a schedule.

In another embodiment of the fuel uplift service, an asymmetric encryption algorithm is implemented wherein two keys are utilized to allow a user to access stored data in the fuel uplift database servers. For example, the asymmetric algorithm uses two keys to secure access to the database servers. The first key is a public key that can be shared among one or more users of the fuel uplift service and input into a data field in the fuel uplift service interface. Once the public key is entered by a user, another key referred to as a private key can be entered into a second data field that either is present in the interface at the beginning of a communication session between a user device and the fuel uplift service, or can appear after the public key is entered. After the public key is input and accepted by the fuel uplift service, the private key can be sent via email, automated telephone call, text, or using another communicative platform that is preferably personnel and secure to the user. Once a user receives the private key, the information accessed in the fuel uplift database servers can be decrypted and accessed by authorized users. In another embodiment, public and/or private keys are also utilized to allow a user to access the fuel uplift service interface on a user device to input fuel uplift data into the system.

Once the required fuel uplift service data has been collected in step 502, the data is submitted to and stored by one or more secure databases included in the fuel uplift service database servers at step 504. The fuel uplift information input by a user can be stored in one database server or distributed across multiple database servers residing on-site and/or at remote locations from the fuel uplift service hosting facility. In one example, the data input into the fuel uplift service interface can be submitted to the fuel uplift database servers after a user engages the submit/enter function. In other examples, input data can be submitted to the fuel uplift database server(s) intermittently as one or more data fields are completed or in real-time.

At step 506, once the input data has been stored to one or more of the fuel uplift database servers, certain of the data stored in the fuel uplift database servers is electronically distributed via network 116 and other networks (if required) to the appropriate fuel uplift service clients and/or participants that are authorized to receive data from one or more of the fuel uplift database servers. The distributed data can either be the input data, data based at least in part on the input data, previously stored data, or other data generated by one or more of the database servers in response to certain input data submitted to the fuel uplift service. The distribution of certain of the data to an appropriate fuel uplift service client and/or user can be predetermined by preferences stored in the fuel uplift service by a fuel uplift client and/or user. In another embodiment, the fuel uplift service can be programmed to send relevant data to a user at a particular time, using a particular platform (e.g., email), and in a particular format.

At step 508, if a fuel product being delivered to an aircraft via a fixed-based operator (FBO) truck is owned by the supplier and not owned by the FBO, the FBO can be considered as an into-plane service provider that requires certain of the uplift data to be transmitted electronically over one or more networks including network 116. For example, if an intermediary into-plane service provider is utilized, the invoicing process can be different than a straight-forward fuel-product seller-customer transaction. This can be due in part to a transaction wherein the fuel is not purchased at the moment the truck is loaded with fuel at a fueling depot. In this embodiment, certain of the fuel uplift data stored in the fuel uplift database server(s) can transmitted to a client/participant FBO for processing its' into-plane fuel fee(s) that will ultimately be submitted to the fuel supplier or the aircraft operator client. In this first example, the fuel uplift data can be submitted in an Excel or CSV format—whichever is preferred by the uplift fuel client and/or participant or as noted in their preferences.

Alternatively, if the fuel delivered to the aircraft is owned by a fuel supplier and the supplier is providing the fuel directly to the aircraft, then the relevant uplift data is electronically transmitted via one or more networks including network 116 to the supplier at step 510 so that the supplier can process an invoice. In another example of the fuel uplift service, the fuel uplift data server(s) can organize the relevant fuel uplift data, generate, based at least in part on the previously stored fuel uplift data, an invoice, and transmit the invoice to the fuel supplier. Similar to the above embodiment, the data can be presented to the supplier in Excel, or CSV format—whichever is preferred by the uplift fuel client and/or participant or as noted in their preferences.

At step 512, at least a portion of the fuel uplift data is utilized by the fuel uplift database server(s) to generate a delivery ticket. As discussed herein, the delivery ticket is generated by the reporting manager module. The delivery ticket is thereafter transmitted to the aircraft operator. The delivery ticket can be delivered via email, in an Excel, CSV or other format, over one or more networks including network 116. The delivery ticket can be made available to the aircraft operator via access to the fuel uplift service at the time of the fueling such that the aircraft operator can view the same. In another embodiment of the present invention, the relevant data can be submitted to an aircraft operator which, in turn, can utilize the received data to generate a fuel delivery ticket.

At step 514, a delivery ticket that is generated by the fuel uplift database server(s) and based at least in part on the user submitted fuel uplift data is made available to authorized fuel uplift clients/participants. In one embodiment, authorized clients/participants can access the delivery ticket via a website that utilizes authentication and security procedures, such as one or more of a user name, password, public key, private key, or some other form of security or encryption methodologies that restrict access to the secure section of the website to only an authorized user. In another embodiment, authorized clients/participants can access the delivery ticket by accessing the fuel uplift database servers directly via one or more networks that include the network 116. As in one or more embodiments described herein, proper security measures including one or more of a user name, password, public key, private key, or some other form of security or encryption methodologies can be utilized.

In another embodiment, the relevant fuel-uplift data can be made available to an into-plane service provider, a fuel supplier, and/or an aircraft operator, at steps 506, 508, 510, and 512 via a secure connection that requires one or more of a user name, password, public key, private key, or some other form of security or encryption methodologies that restrict access to the fuel uplift server(s) to only an authorized user. In one embodiment, an authorized user can access the fuel uplift data and associated generated and stored documents via a secure website. In another embodiment, authorized users can access the database server(s) directly using authorization techniques described herein. In another embodiment, the fuel uplift database server(s) generated documents and reports, including but not limited invoices and delivery tickets, are made available to authorized fuel uplift clients/participants via one or more authorization procedures that are in alignment with the stored client/participant preferences or fuel uplift service guidelines.

Alternatively, the steps described with reference to the flowchart of FIG. 5 can be performed by software, a combination of software and hardware, or by hardware.

In one or more embodiments, a reporting manager residing within the one or more of the fuel uplift service database server(s) 118,128(*a*)-128(*n*) can load a predetermined document form that includes one or more data fields associated with fuel uplift activities. For example, information stored within one or more secured databases associated with one or more data fields identified within Table I provided above, FIG. 5 and FIGS. 6A through 6F can be utilized to generate a fuel delivery ticket or other report identified herein. In one embodiment, the type of form document requested and, in some instances, the recipient and/or the relevant entity for which the document is requested can determine which data fields are included in a form. In other embodiments, form documents can be predetermined such that a standard or generic type of document (e.g., fuel delivery ticket, invoice report, purchase order, accounting report, inventory report, etc.) can be generated in advance and include the necessary data fields therein to be populated by the reporting manager.

In another embodiment, an authorized user of the fuel uplift service system that has the authority to create custom documents and reports can specify which data fields to include in a customized document or report, or add additional data fields to a predetermined document or report. In another embodiment, a reporting manager can utilize report templates that are pre-fashioned and stored in one or more secured databases that are accessible by the reporting manager. In yet another embodiment, the reporting manager can generate report forms and other documents templates based upon a user's needs including the type of information to be included in the report or document, the user's preferences concerning how the user wants to display the information, and the user's system requirements such as, for example, the user's computing capabilities. For example, if the user does not have an application that enables the user to view information in a spreadsheet format or view information that is presented in a graphical format (e.g., bar graph, table, pie-chart, etc.), then the reporting manager can reject a request to display the fuel uplift information in one or more of a graphical or spreadsheet format.

In one or more embodiments, once a document form is created, the reporting manager of the fuel uplift service system can populate each of the data fields with the stored data and generated information associated with a particular data field. For example, once the fuel uplift service determines that a fuel delivery ticket is to be generated, a reporting manager residing within the one or more of the fuel uplift service database server(s) 118,128(a)-128(n) can load a predetermined form or generate a form to be utilized to create a report or document. The predetermined form or generated form can include one or more data fields associated with fuel uplift activities. The reporting manager will populate the data fields with fuel uplift data and information stored in one or more of the database server(s) 118,128(a)-128(n). In one or more embodiments, the reporting manager will associate the relevant stored data and generated information with data fields residing in a document template form using, for example, one or more of an account identifier, recipient name, aircraft operator, date, fuel uplift operation, client name, unique identification number, tax identification, or other information or identifier that allows the fuel uplift service system to determine which stored data and generated information is relevant to complete a particular document form. The reporting manager can utilize the stored and generated data and information to generate graphics such as bar graphs, pie charts, tables, etc. that display relevant information in a visual format. The generated reports can be output to HTML, CSV, PDF, Excel, Word, XML files, or other known formats in the art and described herein so the data can be viewed externally or relied upon by other systems within the fuel uplift service system.

An example of a fuel delivery ticket that can be generated by the reporting manager of the fuel uplift service system will now be described with reference to FIG. 7. The document form entitled "SUPPLIER DELIVERY TICKET" is an example of a predetermined document form that is stored in one or more of the secured databases that reside within one or more of the fuel uplift service database server(s) 118, 128(a)-128(n). For example, an authorized user can select the option for generating a fuel delivery ticket that selects the form document provided in FIG. 7 or another form document with predetermined data fields. In one embodiment, a user can manually input identity information that directs the reporting manager to the stored data and/or files that are relevant to the data fields included in the fuel delivery ticket. This identifying information can be entered either into a data field of the delivery ticket document or into a data field provided on a GUI outside of the fuel delivery ticket. In another embodiment, the reporting manager can automatically determine the identity information using the user's log-in credentials and/or account information.

Once the reporting manager determines which stored data and data files are relevant to the fuel delivery ticket, the reporting manger will automatically populate the data fields with stored data and information and, in some cases, generated data and information that is based upon the stored data and information and/or other information (e.g., current date and time (if applicable)) stored, generated and/or tracked by the fuel uplift service database server(s). In one embodiment, for example, the reporting manager can determine from the input of a barcode identifier that a delivery ticket is to be generated for a fueling uplift operation performed for a customer, (e.g., XYZ Corp.), on a particular date. Once a preference for XYZ Corp. for a particular type of fuel delivery ticket is ascertained, the reporting manager can automatically cycle through each data field included within the predetermined fuel delivery ticket document form and populate each data field with stored data, generated data or other data that is stored, managed or tracked by the fuel uplift service database server(s). For example, the reporting manager can populate the data field entitled "UPLIFT DATE" with date (month, day and year) information that indicates when the fuel uplift operation was performed or will be performed for XYZ Corp. For example, the reporting manager can associate the date information with the data field by finding the "UPLIFT DATE" data associated with a unique identifier that is associated with the unique "Bar Code" identifier. The unique identifier can be the "Bar Code" data itself or can be one or more other identifiers associated with fuel uplift data that has been stored, generated or managed by the fuel uplift service system database server(s). Once the relevant data fields in the fuel delivery ticket described with reference to FIG. 7 have been populated, the delivery ticket can be sent to the relevant fuel uplift service customer for his/her signature via email, fax, or some other form of electronic document delivery for the customer to apply his/her signature. Thereafter, the form can be transmitted back to the fuel uplift service system via the fuel uplift service website or via a network connection to the system using a user device 102 or another device that can access the fuel uplift service.

One or more embodiments of the fuel uplift service system can perform inventory and client management functions and operations, via the audit and inventory level management module, and automatically generate an inventory report, via the reporting manager, that can be transmitted to an authorized user. The audit and inventory level management module can be a separate module or part of the inventory monitoring module 190 described herein with reference to FIG. 1B. As described with reference to the graphic user interfaces provided in FIGS. 8A and 8B, one of the purposes of an inventory report that is generated by the fuel uplift service reporting manger is to provide a tool and method for a supplier to manage its inventory and client sales. Authorized suppliers can manage their respective inventories via reports that can be accessed via the fuel uplift service website, or via a network. Once access is granted, authorized suppliers or other users can see volume information specific to their respective company sales. In one or more embodiments, an audit and inventory level management module is utilized such that an authorized supplier can see an estimate of its inventory level as of that moment, or a forecast of its inventory levels over a specified period in time based upon historical data and/or extrapolated data.

As described herein with reference to FIG. 8A, a supplier can interact with a graphic user interface to select a start and stop date and time at rows 2-3 (e.g., "XX-XXX-XX" and "XX:XX LCL") and an end date and end time at rows 4 and 5 (e.g., "XX-XXX-XX" and "XX:XX LCL") for the inventory report. Here, a user can input any Year, Month, Day and time as needed. The graphics user interface can also display the date in another format (e.g., Day,Month,Year; Year, Month,Day; etc.) if a day, month and year can be entered into or selected within the interface. Additionally, the graphics user interface utilizes a 24-hour format that wherein a user can enter any start and end time desired using a 24-hour format. The supplier can also enter any additional inventory that was added during the selected time period. Once the relevant data is entered into the GUI, the fuel uplift service system, via the audit and inventory level management module, will utilize previously stored data, generated data or other data concerning the inventory of a fuel supplier or other relevant entity to total the sales during the specified period and provide the supplier with a current inventory estimate. As described with reference to the chart illustrated in FIG. 8A, an authorized user can access a fuel uplift service inventory reporting GUI that allows the user to input (1) a location code, (2) a start date, (3) a start time, (4) an end date, (5) an end time, (6) a beginning inventory amount, and (7) an amount of inventory that has been delivered to the fuel supplier during the relevant time period, which is the time period between the input start date:time and end date:time (data items (3):(4) and (5):(6)) described in the graphics user interface of FIG. 8A. In one or more other embodiments, the fuel uplift service, via the audit and inventory level management module, can estimate the beginning amount (data item 6) based upon previously stored data if the relevant data is available. In one or more embodiments, one or more of the relevant data items in the requisite fields can be input by a user utilizing the fuel uplift service website and submitted to one or more fuel uplift service database server(s) 118,128(*a*)-128(*n*). In another embodiment, a user utilizing a user device can submit the requisite data over a network using the fuel uplift service interface. Once the required product data and temporal data is acquired, the audit and inventory level management module will calculate (a) the total sales during the specified period, and (b) a current inventory estimate. Thereafter, the reporting manager will display (a) and (b) in a report that can be viewed and downloaded by authorized users.

For example, as is seen in the graphics user interface of FIG. 8B, an authorized user can choose to determine (1) the total sales output in measures of volume for the time period starting on 12:01 AM on Mar. 20, 2017 to 11:59 PM on Mar. 27, 2017, and (2) an estimated current inventory estimate. The user has chosen to input a beginning inventory amount of 2,050,500 L of fuel, and input an amount of 317,974 L of fuel as the inventory delivered during the chosen time period. The audit and inventory level management module uses previously stored and managed sales data that resides in one or more of the fuel uplift service database server(s) 118,128(*a*)-128(*n*) and attributed to the relevant fuel supplier and calculates the amount of fuel sold during the relevant time period. Additionally, the audit and inventory level management module uses the following algorithm to determine the fuel supplier's estimated ending inventory during that same time period: (6) the input beginning inventory amount+(plus) (7) the input amount of inventory that has been delivered to the fuel supplier during the relevant time period stored −(minus) (8) the amount of fuel sold during the relevant time period. In this example, the audit and inventory level management module determined that the amount of fuel sold during the relevant time period was 1,575,050 L of fuel. As is seen in the results of the GUI of FIG. 8B, the audit and inventory level management module determined that the estimated ending inventory amount of fuel is 793,424 L. This simplistic example provided herein is just one example of an inventory level management function and should not be used as a limitation of the capabilities of the inventory level management module.

The reporting manager can generate and store retrievable reports detailing (1) the total of sales by volume that occurred during the relevant time period, and (2) the estimated ending inventory amount during the relevant time period. Based upon these values that can be generated for a series of relevant time periods, an authorized fuel uplift service user can set alert thresholds using the GUI of the fuel uplift service on the fuel uplift service website. For example, using one or more of the methods described herein, the reporting manager can calculate current inventory values (a) in the event that certain triggering events occur, (b) a predetermined number of times over a predetermined time period, or (c) upon request. If a supplier's inventory rises above and/or falls below a certain threshold at any time, and/or if a supplier's inventory rises above and/or falls below a certain threshold within a certain time period, the fuel uplift service can send an alert to the supplier or other designated entities. The alert can come in the form of an email, text message, visual alert across the fuel uplift service website, or any other form of alert that is known in the industry or known by those having skill in the art. The same methodology described in one or more of the embodiments herein can be used to calculate sales by sales volume to a specific client at a specific location by a supplier. As with the location volume, only authorized fuel suppliers can view this information. The fuel uplift service can also limit inventory and sales information to fuel suppliers that participate in the fuel transactions. Additionally, alarms can be set that alert a user supplier to a threshold reached by a fuel uplift client.

The mobile computing devices 102(*a*) can communicate wirelessly through the communication interface 114, which can include digital signal processing circuitry where necessary. The communication interface 114 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA, or GPRS (General Packet Radio Service), among others. Such communication can occur, for example, utilizing a transceiver using a radio-frequency. In addition, short-range communication can occur, such as using a Bluetooth, WiFi, or other such transceiver (not shown). In addition, a GPS (Global Positioning System) receiver module can be included in the mobile user devices and provide additional navigation and location-related wireless data to the mobile computing device 102(*a*), which can be used as appropriate by applications running on the mobile computing device 102(*a*).

A number of implementations of the present invention have been described herein. Nevertheless, it will be understood that various modifications can be made without departing from the spirit and scope of the disclosure. For example, steps of the present disclosure can be performed in a different order and still achieve desirable results. More specifically, one or more embodiments of the present invention provided herein can be utilized to assist in the uptake of sand, grain, salt, or other fungible goods or other commodities that are stored in storage compartments such as tanks, silos, etc. and uplifted to secondary storage compartments, such as gas tanks, train cars or others storage devices suitable for the purpose.

The embodiments of the systems, methods and implementations described herein can be realized in digital electronic circuitry, integrated circuitry, specially designed ASICs (application specific integrated circuits), computer hardware, firmware, software, and/or combinations thereof. These various embodiments can include one or more embodiments in one or more computer programs that are executable and/or interpretable on a programmable system including at least one or more programmable processors, which can be special or general purpose, coupled to receive data and instructions from, and to transmit data and instructions to, a storage system, at least one input device, and at least one output device.

The modules and software applications discussed herein (which are also known as and/or can be implemented as computer programs, software programs, or code) include machine instructions for one or more programmable processors, and can be implemented in a high-level procedural and/or object-oriented programming language, and/or in assembly/machine language. As used herein, the terms machine-readable storage medium and computer-readable storage medium refer to any non-transitory computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A non-transitory machine-readable storage medium does not include a transitory machine-readable signal.

The embodiments of the systems, methods and implementations described herein can be implemented in a computing system that includes a back end component (e.g., as a data server 1324), or that includes a middleware component (e.g., an application server 1320), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiments and implementation details, these embodiments and implementation details should not be construed as limitations on the scope of any one or more embodiments or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features can be described above as acting in certain combinations and even initially claimed as such, one or more features from a claimed combination can in some cases be excised from the combination, and the claimed combination can be directed to a sub combination or variation of a sub combination.

Similarly, while one or more method steps, processes, and operations are depicted in the drawings in a particular order, this should not be understood as requiring that such method steps, processes, and operations be performed in the particular order shown or in sequential order, or that all illustrated method steps, processes, and operations be performed, to achieve desirable results. It is to be understood that in certain circumstances, multitasking and parallel processing can be advantageous. Moreover, the separation of various system components in the embodiments described above should not be understood as requiring such separation in all embodiments, and one having skill in the art will appreciate that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include" and/or "includes" and/or "comprises" and/or "comprising" and/or "has" and/or "having" and/or "contains" and/or "containing", when used in this specification, specify the presence of stated features, integers, steps, operations, elements, and/or components, but do not preclude the presence or addition of one or more other features, integers, steps, operations, elements, components, and/or groups thereof.

The invention claimed is:

1. A computing system, comprising:
   a communication interface connectable to a fuel uplift data management processing device over a computer network,
   one or more secure databases configured to store fuel uplift information accessible via an authorized access request;
   the fuel uplift data management processing device comprising one or more processors capable of interacting with the one or more secure databases to manipulate the fuel uplift information in response to the authorized access;

a graphical user interface that includes a plurality of data fields and is configured to enable a user to input fuel uplift information into one or more of the data fields based upon criteria using an input device and transmit the input fuel uplift information to the fuel uplift data management processing device;

wherein at least one of the one or more processors utilizes the criteria to determine if the input fuel uplift information is within acceptable limits, the criteria including one or more of previously stored fuel uplift information, previously transmitted input fuel uplift information, global-positioning data, date information, time information, fuel information, language information, geographical information, and currency information;

an inventory monitoring module that, when executed by at least one of the one or more processors, configures the at least one processor to manage and track fuel inventory levels of a client and generate fuel management and tracking information to be accessibly stored on at least one of the one or more secured databases;

a reporting manager that includes software instructions that, when executed by at least one of the one or more processors, uses one or more document templates that includes a plurality of data fields, identifies at least a portion of the fuel uplift information stored in one or more of the databases, associates the identified fuel uplift information with the appropriate data fields included in at least one of the one or more document templates, and generates a fuel uplift document, a transaction number and tracking module that, when executed by at least one of the one or more processors, configures the at least one processor to assign a unique first transaction number to a fuel uplift customer order and a unique second transaction number to a fuel product, and track the customer order and fuel product from respective first times the first and second transaction numbers are received into one or more of the secure databases to respective second times the first and second transaction numbers are tagged as obsolete, wherein the second time associated with the customer order represents a time that an obligation owed pursuant to the customer order is satisfied, wherein the second time associated with the fuel product represents a time that the fuel product is uplifted to an aircraft or transferred to a customer, and wherein the tracking module includes software instructions that, when executed by the at least one processor, further configures the at least one processor to assign a unique tracking number to a fuel uplift device utilized by a fuel supplier to perform fuel uplift operations, wherein the tracking number is stored in at least one of the one or more secure databases in a manner such that the tracking module further configures the at least one processor to utilize the tracking number to track the fuel uplift device over a historical period beginning at or after a first time when the unique tracking number associated with the fuel uplift device is received into one or more of the secure databases and ending at or before a second time when the unique tracking number is tagged as obsolete, wherein the second time represents a time that the fuel uplift device is no longer in the fuel supplier's inventory.

2. The system of claim 1 wherein the reporting manager includes software instructions that, when executed by the at least one processor, further configures the at least one processor to utilize at least a portion of the fuel uplift information to generate graphic data that represents the portion of the fuel uplift information in a graphic format and display the graphic data in the generated fuel uplift document.

3. The system of claim 1, wherein the one or more secure databases further comprise an accounting record database that stores fuel uplift account information, and wherein the system of claim 1 further comprises an account invoice module that, when executed by at least one of the one or more processors, configures the at least one processor to manipulate at least a portion of the fuel uplift account information and generate accounting records associated with a supplier of aircraft fuel.

4. The system of claim 1, wherein the one or more secure databases further comprise an inventory record database that stores fuel uplift inventory information, wherein the inventory information includes fuel product levels, sales information, and delivery information, and wherein the inventory monitoring module includes software instructions that, when executed by the at least one processor, further configures the at least one processor to manipulate at least a portion of the inventory information and generate information relating to the amount of fuel products in a fuel supplier's inventory.

5. The system of claim 4, wherein the inventory monitoring module utilizes fuel uplift inventory information to estimate an amount of fuel a fuel supplier will have on a predetermined date, the inventory information including a start date, a start time, an end date, an end time, an amount of fuel the fuel supplier has on the start date, an amount of fuel that has been delivered and an amount of fuel that will be delivered to the fuel supplier between the start and end dates, and the amount of fuel the fuel supplier has sold and a projected amount of fuel the fuel supplier will sale between the start and end dates.

6. The system of claim 5, wherein the inventory monitoring module includes an electronic spreadsheet inventory module that includes software instructions that, when executed by the at least one processor, further configures the at least one processor to arrange the fuel uplift inventory information in a spreadsheet format.

7. The system of claim 1, wherein the computer system further comprises an imaging module that, when executed by at least one of the one or more processors, configures the at least one processor to convert images of fuel uplift information to machine-coded text that is associated with a fuel uplift operation.

8. The system of claim 1, wherein the computer system further comprises a unit conversion module that, when executed by at least one of the one or more processors, configures the at least one processor to convert one standard unit of measurement associated with aircraft fuel to be uplifted to an aircraft to another standard unit of measurement.

9. The system of claim 1, wherein the computer system further comprises a pricing and discount conversion module that, when executed by at least one of the one or more processors, configures the at least one processor to allow a fuel supplier to assign pricing to quantities of aircraft fuel, apply discounts based upon a quantity of aircraft purchased, and create customer pricing schedules.

10. The system of claim 1, wherein the computer system further comprises a location code module that, when executed by at least one of the one or more processors, configures the at least one processor to utilize airport location codes, warehouse codes, aircraft staging codes and fuel storage bin codes to track fuel products, aircraft fuel uplift activities and fuel uplift equipment from a first location to a second location.

11. The system of claim 1, wherein the reporting manager includes software instructions that, when executed by the at least one processor, further configures the at least one processor to automatically generate a report that is customizable by an authorized user to include only the types of fuel uplift information selected by the user.

12. The system of claim 1, wherein the network comprises at least one of a public network, a public switched telephone network, the Internet, a wide area network, a local area network, and a proprietary network.

13. The system of claim 1, wherein the graphical user interface is displayed on a user device that comprises at least one of a portable computing device, a personal digital assistant, a wireless smartphone, a personal computer, and a game terminal, and wherein at least a portion of the fuel uplift information stored by the one or more secure databases is received from the user device.

14. The system of claim 13, wherein the graphical user interface is configured to assist in the prevention of transmitting incorrect fuel uplift information to the one or more secure databases by generating an error message in response to an entry into at least one of the data fields by comparing at least one of: (i) global positioning data with an airport code entry, (ii) a type of aircraft entry with a fuel product entry, and (iii) a type of fuel delivery equipment with a type of fuel uplift service.

15. The system of claim 1, wherein the reporting manager includes software instructions that, when executed by the at least one processor, further configures the at least one processor to generate graphical a summarization of at least a portion of the fuel uplift information, the graphical summarization including at least one of a chart, a graph and a table.

16. The system of claim 1, wherein the inventory monitoring module includes software instructions that, when executed by the at least one processor, further configures the at least one processor to provide a forecast of a fuel supplier's inventory levels of a fuel product for a predetermined specified time in the future based at least in part upon historical fuel uplift data and extrapolated fuel uplift data.

17. The system of claim 1, wherein the computer system further comprises a verification module that, when executed by at least one of the one or more processors, configures the at least one processor to utilize a user assigned log-in, a user assigned password, and an access key to allow a user to interact with the computer system and input and receive fuel uplift information over the network.

18. A computing system, comprising:
a communication interface connectable to a fuel uplift data management processing device over a computer network,
one or more secure databases configured to store fuel uplift information accessible via an authorized access request, wherein the one or more secure databases include an accounting record database configured to store fuel uplift account information and an inventory record database configured to store fuel uplift inventory information;
the fuel uplift data management processing device comprising one or more processors capable of interacting with the one or more secure databases to manipulate the fuel uplift information in response to the authorized access;
a graphical user interface that includes a plurality of data fields and is configured to enable a user to input fuel uplift information into one or more of the data fields based upon criteria using an input device and transmit the input fuel uplift information to the fuel uplift data management processing device;
wherein at least one of the one or more processors utilizes the criteria to determine if the input fuel uplift information is within acceptable limits, the criteria including one or more of previously stored fuel uplift information, previously transmitted input fuel uplift information, global-positioning data, date information, time information, fuel information, language information, geographical information, and currency information;
an inventory monitoring module that, when executed by at least one of the one or more processors, configures the at least one processor to manage and track fuel inventory levels of a client and generate fuel management and tracking information to be accessibly stored on at least one of the one or more secured databases;
an account invoice module that, when executed by at least one of the one or more processors, configures the at least one processor to manipulate at least a portion of the fuel uplift account information and generate accounting records associated with a supplier of aircraft fuel;
a transaction number and tracking module that, when executed by at least one of the one or more processors, configures the at least one processor to assign a unique first transaction number to a fuel uplift customer order and a unique second transaction number to a fuel product, and track the customer order and fuel product from respective first times the first and second transaction numbers are received into one or more of the secure databases to respective second times the first and second transaction numbers are tagged as obsolete,
wherein the second time associated with the customer order represents a time that an obligation owed pursuant to the customer order is satisfied, and wherein the second time associated with the fuel product represents a time that the fuel product is uplifted to an aircraft or transferred to a customer,
and wherein the tracking module includes software instructions that, when executed by the at least one processor, further configures the at least one processor to assign a unique tracking number to a fuel uplift device utilized by a fuel supplier to perform fuel uplift operations, wherein the tracking number is stored in at least one of the one or more secure databases in a manner such that the tracking module further configures the at least one processor to utilize the tracking number to track the fuel uplift device over a historical period beginning at or after a first time when the unique tracking number associated with the fuel uplift device is received into one or more of the secure databases and ending at or before a second time when the unique tracking number is tagged as obsolete, wherein the second time represents a time that the fuel uplift device is no longer in the fuel supplier's inventory;
a unit conversion module that, when executed by at least one of the one or more processors, configures the at least one processor to convert one standard unit of measurement associated with aircraft fuel to be uplifted to an aircraft to another standard unit of measurement;
a pricing and discount conversion module that, when executed by at least one of the one or more processors, configures the at least one processor to allow a fuel supplier to assign pricing to quantities of aircraft fuel, apply discounts based upon a quantity of aircraft purchased, and create customer pricing schedules;

a location code module that, when executed by at least one of the one or more processors, configures the at least one processor to utilize airport location codes, warehouse codes, aircraft staging codes and fuel storage bin codes to track fuel products, aircraft fuel uplift activities and fuel uplift equipment from a first location to a second location;

a reporting manager that includes software instructions that, when executed by at least one of the one or more processors, uses one or more document templates that includes a plurality of data fields, identifies at least a portion of the fuel uplift information stored in one or more of the databases, associates the identified fuel uplift information with the appropriate data fields included in at least one of the one or more document templates, and generates a fuel delivery ticket.

* * * * *